US012254505B2

(12) United States Patent
Cornacchia et al.

(10) Patent No.: US 12,254,505 B2
(45) Date of Patent: Mar. 18, 2025

(54) MERCHANT SELECTION MODEL FOR DYNAMIC MANAGEMENT OF ADD-ONS FOR DELIVERY SERVICE ORDERS

(71) Applicant: Uber Technologies, Inc., San Francisco, CA (US)

(72) Inventors: Robert Louis Cornacchia, New York, NY (US); Emre Demiralp, San Francisco, CA (US); Cinar Kilcioglu, New York, NY (US); Kevin A. Rowe, New York, NY (US); Zhengyun Sun, Jersey City, NJ (US); Vishnu Sundaresan, San Francisco, CA (US); Ameya Tayade, White Plains, NY (US); Justin Wie, New York, NY (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 287 days.

(21) Appl. No.: 17/733,276

(22) Filed: Apr. 29, 2022

(65) Prior Publication Data

US 2023/0351477 A1 Nov. 2, 2023

(51) Int. Cl.
*G06Q 30/00* (2023.01)
*G06Q 30/0282* (2023.01)
*G06Q 30/0601* (2023.01)

(52) U.S. Cl.
CPC ..... *G06Q 30/0635* (2013.01); *G06Q 30/0282* (2013.01)

(58) Field of Classification Search
None
See application file for complete search history.

(56) References Cited

U.S. PATENT DOCUMENTS

| 10,043,149 | B1 * | 8/2018 | Iacono | G06Q 30/0637 |
| 2014/0164126 | A1 | 6/2014 | Nicholas et al. | |
| 2016/0063473 | A1 | 3/2016 | Lee | |
| 2017/0287086 | A1 | 10/2017 | Lopez et al. | |
| 2020/0279191 | A1 | 9/2020 | Koch et al. | |

OTHER PUBLICATIONS

Food On Demand, "DoorDash DoubleDash Allows Multiple Stores in One Order", https://foodondemandnews.com/08122021/doordash-doubledash-allows-multiple-stores-in-one-order/, retrieved on May 20, 2022, 5 pages.

* cited by examiner

*Primary Examiner* — Mila Airapetian
(74) *Attorney, Agent, or Firm* — Dority & Manning, P.A.

(57) ABSTRACT

Systems and method for dynamically managing add-on orders within a delivery service application. For example, a computer-implemented method includes obtaining data indicative of a primary order request. The method includes selecting, ranking, and displaying menu items for add-on orders associated with a primary order. The method includes obtaining user data provided by a user through a user interface associated with a delivery service application. The method includes determining, in response to obtaining the user data, that the primary order request is eligible for an add-on order. The method includes determining merchants for the add-on order. The selected merchants can be determined from a plurality of candidate merchants based at least in part on analysis of merchant-specific data relative to the user data indicative of the primary order request. The method includes updating the user interface to display data associated with the one or more selected merchants for the add-on order.

20 Claims, 14 Drawing Sheets

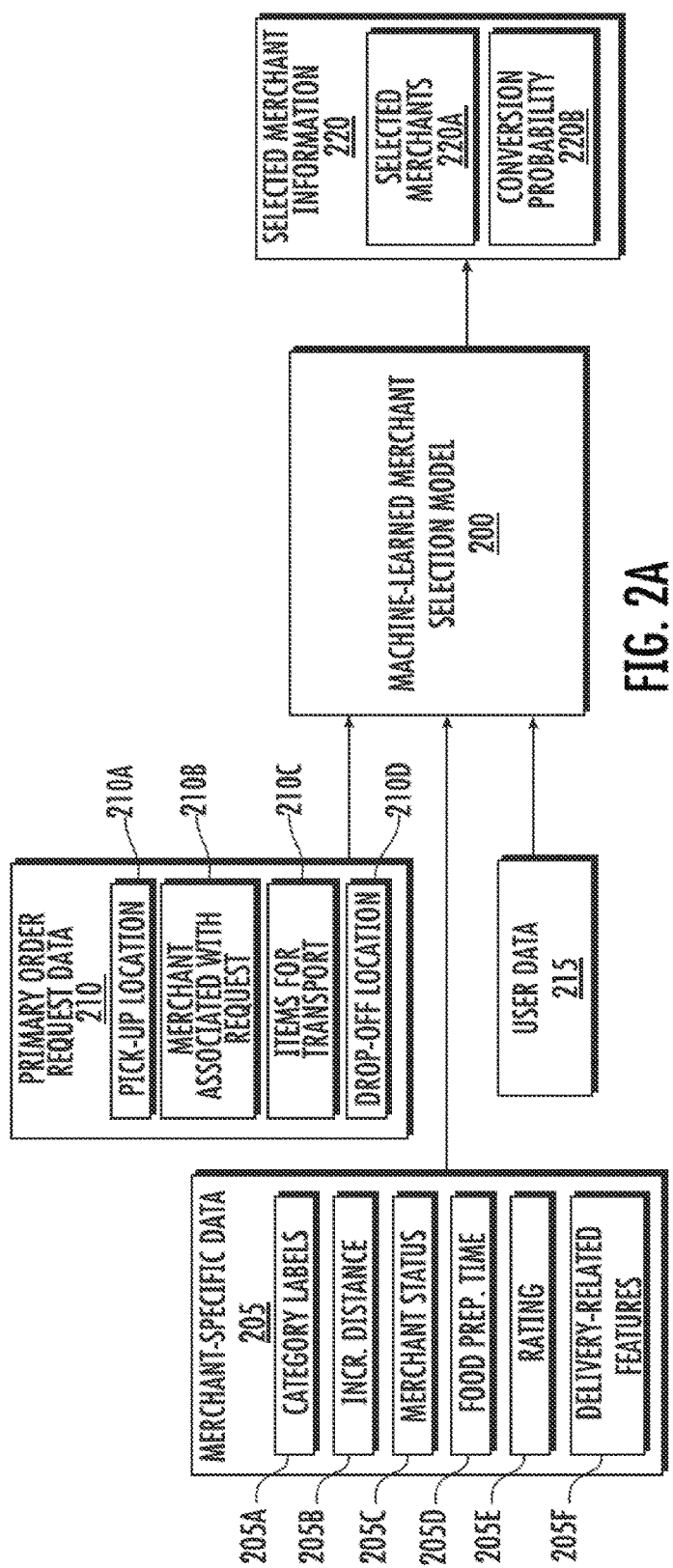
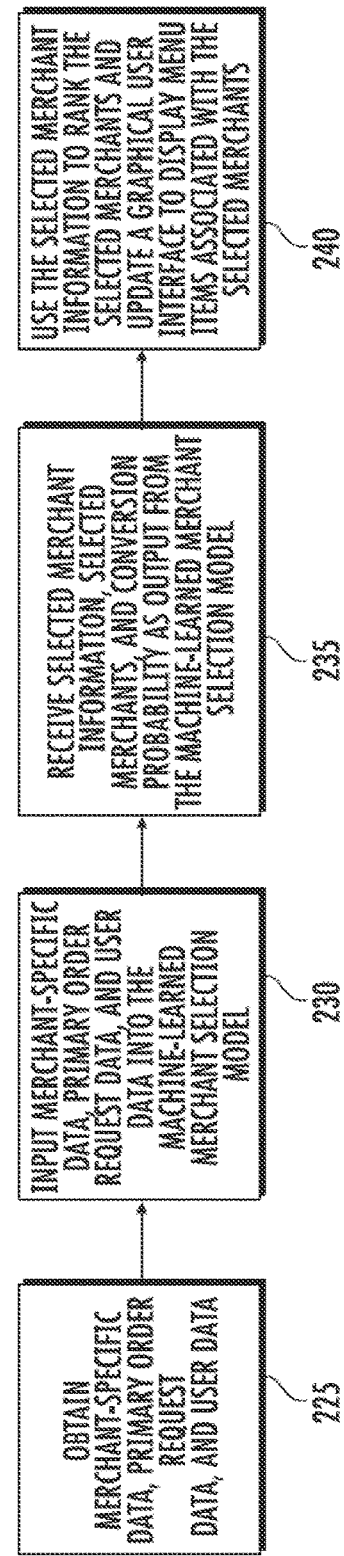
FIG. 2A
FIG. 2B

MERCHANT SELECTION MODEL FOR DYNAMIC MANAGEMENT OF ADD-ONS FOR DELIVERY SERVICE ORDERS

FIELD

The present disclosure generally relates to dynamically managing add-on orders within a delivery service application. More particularly, the present disclosure is directed to features for selecting, ranking, and displaying menu items for add-on orders associated with a primary order.

BACKGROUND

Food delivery services allow a user to request a service that may be performed by a vehicle and/or courier. For instance, a user may request, through a food delivery service application, a food delivery service having a pick-up location, a drop-off location, and an item for delivery. A courier can be assigned to perform the food delivery service for the user. This can include transporting the delivery of the item to the drop-off location.

SUMMARY

Aspects and advantages of embodiments of the present disclosure will be set forth in part in the following description, or may be learned from the description, or may be learned through practice of the embodiments.

One aspect of the present disclosure is directed to a computing system. The computing system includes one or more processors and one or more tangible, non-transitory, computer readable media that store instructions that are executable by the one or more processors to cause the computing system to perform operations. The operations include obtaining user data provided by a user through a user interface associated with a delivery service application. The user data can be indicative of a primary order request. The operations include determining, in response to obtaining the user data, that the primary order request is eligible for an add-on order. The operations include determining, in response to the primary order request being eligible for the add-on order, one or more selected merchants for the add-on order. The one or more selected merchants can be determined from a plurality of candidate merchants based at least in part on analysis of merchant-specific data relative to the user data indicative of the primary order request. The operations include updating the user interface to display data associated with the one or more selected merchants for the add-on order.

Another example aspect of the present disclosure is directed to a computer-implemented method. The method includes obtaining user data provided by a user through a user interface associated with a delivery service application. The user data can be indicative of a primary order request. The method includes determining, in response to obtaining the user data, that the primary order request is eligible for an add-on order. The method includes determining, in response to the primary order request being eligible for the add-on order, one or more selected merchants for the add-on order. The one or more selected merchants are determined from a plurality of candidate merchants based at least in part on analysis of merchant-specific data relative to the user data indicative of the primary order request. The method includes updating the user interface to display data associated with the one or more selected merchants for the add-on order. The method includes receiving user input provided through the user interface indicative of a selection of one or more menu items associated with the one or more selected merchants for the add-on order. The method includes coordinating delivery of the primary order and the add-on order.

Yet another example aspect of the present disclosure is directed to one or more non-transitory computer readable media storing instructions that are executable by one or more processors to perform operations. The operations include obtaining user data provided by a user through a user interface associated with a delivery service application. The user data can be indicative of a primary order request. The operations include determining, in response to obtaining the user data, that the primary order request is eligible for an add-on order. The operations include determining, in response to the primary order request being eligible for the add-on order, one or more selected items for the add-on order. The one or more selected items can be determined from a plurality of candidate items associated with one or more candidate merchants based at least in part on analysis of at least one of (i) item data or (ii) merchant-specific data relative to the user data indicative of the primary order request. The operations can include providing for display, via a user interface, data associated with the one or more selected items for the add-on order.

BRIEF DESCRIPTION OF THE DRAWINGS

Detailed discussion of embodiments directed to one of ordinary skill in the art are set forth in the specification, which makes reference to the appended figures, in which:

FIGS. 2A-2B depict block diagrams associated with a machine-learned merchant selection model according to aspects of the present disclosure.

DETAILED DESCRIPTION

Figure 1:
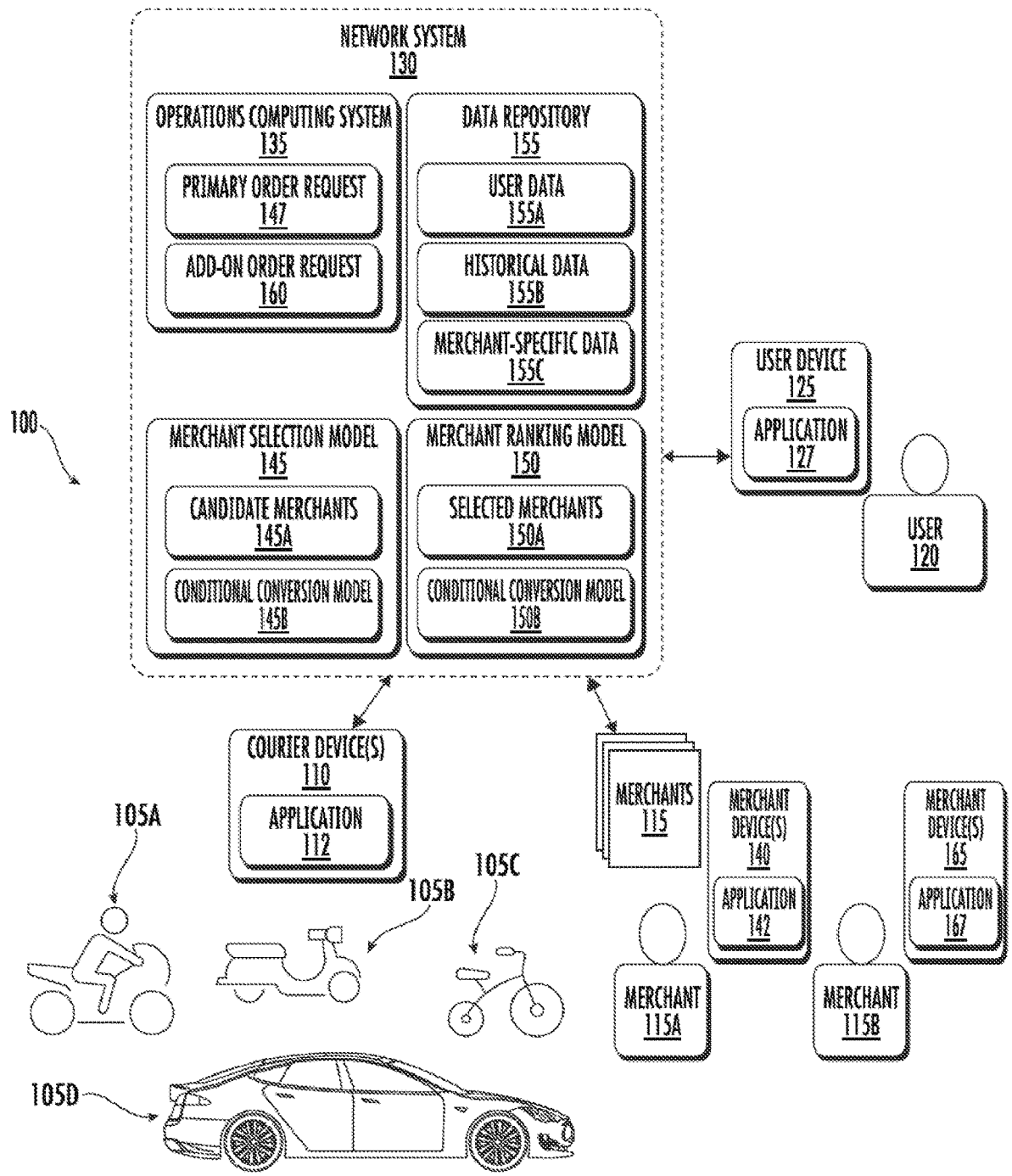
FIG. 1 depicts a block diagram of an example system for selecting and ranking merchants for add-on orders according to aspects of the present disclosure.

Generally, the present disclosure is directed to improved systems and methods for dynamic management of add-on orders within a delivery service application. More particularly, the present disclosure is directed to features for selecting, ranking, and displaying menu items for add-on orders associated with a primary order. Aspects of the present disclosure can include strategically selecting and/or ranking candidate merchants for add-on orders based on characteristics of the primary order and the add-on orders as well as characteristics of the candidate merchants, available couriers, and/or users of the delivery service application. In some examples, users of the delivery service application can be human users. In some examples, users of the delivery system can be non-human users. For instance, a delivery service can be associated with merchants (e.g., restaurants, convenience stores, service providers). The delivery service can facilitate the receipt and delivery of a delivery service request via an operations computing system (e.g., a network system/platform).

In accordance with an example implementation, the operations computing system can obtain user data provided through a user interface associated with a delivery service application. In some examples, the user interface can be a graphical user interface. While the user interface is described as a graphical user interface throughout the specification, this is meant as an illustration and not meant as a limitation. The user interface can be any available user interface. The user data can be indicative of a primary order request. In response to obtaining the user data, the system can determine if the primary order request is eligible for an add-on order. In response to determining that the primary order request is eligible for an add-on order, the system can determine one or more selected merchants for the add-on order. The one or more selected merchants can be determined from a plurality of candidate merchants based at least in part on analysis of merchant-specific data relative to the user data indicative of the primary order request. The system can update the user interface to display data (e.g., audio, visual) associated with the one or more selected merchants for the add-on order.

The technology of the present disclosure can improve the process of selecting add-on items associated with add-on merchants to be displayed on a user device based on a likelihood of conversion (e.g., user completing an add-on order purchase) and a cost of fulfilling an add-on order (e.g., incremental distance, inability to batch the primary order and add-on order). The operations computing system can systematically analyze a plurality of candidate merchants to select merchants to display for add-on orders. This analysis can be based on data associated with the primary order request, data associated with the merchant, data associated with the user, and/or data associated with available couriers. The system can reduce computational and economic costs by surfacing recommendations that optimize user experience, cost to user, delivery time, cost to courier, and/or any other relevant considerations.

The selected merchants can be selected from a plurality of candidate merchants. For example, determining the selected merchants can be performed using a machine-learned merchant selection model that is trained using merchant selection training data gathered by the computing system or otherwise accessed by the computing system. This merchant selection training data can include data associated with the merchants. The data associated with the merchants can include category labels (e.g., machine learning based prediction of cuisine type), incremental distance (e.g., incremental haversine distance, incremental ETA), merchant status (e.g., accepting orders or not accepting orders), food preparation time (e.g., for each individual item), rating, and/or delivery-related features.

By way of example, the selected merchants can be ranked based on data associated with the merchant. The selected merchants can be ranked using a machine-learned ranking model. The machine-learned ranking model can be trained based on historical data associated with prior orders made by one or more given users and/or facilitated by the delivery service. Inputs into the machine-learned ranking model can include a likelihood of conversion (e.g., a probability of fulfilling an add-on order associated with a selected merchant (e.g., conversion probability), a cost of fulfilling the add-on order, one or more waypoints associated with the primary order request, and/or one or more available transportation modes. The output of the machine-learned ranking model can include a probability that the user will complete an add-on order purchase (e.g., conversion probability, likelihood of conversion) and/or an expected cost of fulfilling the add-on order purchase. A cost of fulfilling the add-on order can be determined based on a user experience measure, a food freshness measure, an added travel time, an increased estimated time of arrival, and/or an ability to match a primary order courier with the add-on order. Additionally, or alternatively, the ranking can be performed by a rules-based ranking model.

A top number of merchants and/or items associated with the top number of merchants can be selected for display within the delivery service application. The graphical user interface can be updated to display the top number of merchants. Alongside each merchant, a plurality of menu items available from each merchant can be displayed to a user. The system can receive an input from the user indicative of a selection of one or more items from the top number of merchants. The system can coordinate delivery of the primary order and the add-on order to a drop-off location associated with the primary order request. The menu items can include tangible items and/or services. In some examples, the primary order can be for an item and/or service. In some examples, the add-on order can be for an item and/or service. The primary order request can include data indicative of a pick-up location, a merchant associated with the primary order request, one or more items for transport, and a drop-off location.

The add-on order can be associated with various promotions. For example, the add-on order can be associated with a zero delivery fee (or reduced delivery fee), a zero service charge (or reduced service charge), or any other special offer, promotion, discount, reward, and/or benefit to the user.

The technology of the present disclosure can provide a number of technical effects and benefits. For instance, aspects of the described technology can allow for more efficient and intelligent surfacing of candidate add-on order items and add-on order merchants. The merchant selection model can provide a basis by which to evaluate candidate merchants for add-on orders for users. This can help reduce the computational processing and bandwidth usage by decreasing the amount of data surfaced to a user and only surfacing options that a user is likely to select. Further, based on historical user input, a graphical user interface can be personalized to each user based on historical data associated with the user, data associated with the primary order, and/or data associated with the delivery service network as a whole (e.g., predicted item preparation time, available couriers, predicted future demand).

The technology described herein includes the collection of data and provision of certain content to users associated with a vehicle service. Users can be given the opportunity to customize data collection and provision features. Data collection and provision can be configured with options for permissions to be obtained from users such that data is collected or provided for authorized use in accordance with the disclosed techniques. For example, a user can control whether certain usage data is collected and/or whether certain content is provided to the user (e.g., through opt-out features, settings). Any personal data can be removed and data can be stored in a secured, anonymized manner. In this manner, the users can be provided control over what data is collected, used, and provided to a user for the implementations described herein.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. With reference to the figures, example embodiments of the present disclosure will be discussed in further detail.

FIG. 1 depicts a block diagram of an example system 100 for dynamic management of add-on orders within a delivery service application. As illustrated, FIG. 1 shows a system 100 that can include a one or more vehicles 105A-D (e.g., a car, scooter, motorcycle, bicycle) and one or more courier devices 110 that can be associated with one or more couriers. In some examples, the one or more couriers are humans. In some examples, the courier can be non-human (e.g., vehicle, autonomous vehicle, autonomous robot). The one or more couriers and the one or more courier devices 110 (e.g., an onboard tablet, a mobile device of a courier) can be associated with the one or more vehicles 105A-D. The courier device(s) 110 can include a software application 112 associated with the food delivery service entity, which can run on the courier device(s) 110. The system 100 can include one or more merchants 115. The merchants 115 can receive data indicative of a food delivery service request from a user 120. For example, the user 120 can submit a request through a user device 125 associated with the user (e.g., via a software application 127). A network system 130 can comprise a computing system associated with a service entity that can facilitate a request for services from user 120. An operations computing system 135 associated with the food delivery service entity can facilitate a request for services from user 120. For example, the user 120 can submit a food delivery request through a user device 125 associated with the user 120 (e.g., via a software application 127). Operations computing system 135 can receive a food delivery service request for a primary order request 137 from a user device 125. The operations computing system 135 can send data indicative of primary order request 137 to a merchant device 140 associated with a merchant 115A (e.g., via a software application 142).

The operations computing system 135 can receive data indicative of a merchant 115A accepting a food preparation request (e.g., food being prepared, estimated preparation time). The operations computing system can send a request to a courier device 110 associated with the courier to complete the primary order request 137 (e.g., via application 112). The network system 130 can include a merchant selection model 145 and and/or a merchant ranking model 150. In some instances, the merchant selection model 145 and merchant ranking model 150 can be the same model. The merchant selection model 145 can include data indicative of candidate merchants 145A. The merchant selection model 145 can include a conditional conversion model 145B. The merchant ranking model can include data indicative of selected merchants 150A. The merchant ranking model 150 can include a conditional conversion model 150B.

The network system 130 can include a data repository 155. The data repository 155 can include user data 155A (e.g., data associated with user 120), historical data 155B (e.g., data associated with user 120, data associated with merchant(s) 115, data associated with couriers), merchant-specific data 155C (e.g., real-time data associated with merchants 115), and/or any other relevant data (e.g., system-level data associated with a plurality of users, expected demand).

The merchant selection model 145 and/or merchant ranking model 150 can use data from the data repository 155 to surface one or more ranked merchants for display on a user device 125 (e.g., via application 127). The operations computing system 135 can receive data indicative of an add-on order request 160 from a user device 125 (e.g., via application 127) for an add-on order. The operations computing system 135 can send data indicative of an add-on order request 160 to a merchant device 165 (e.g., via application 167). The merchant 115B can receive data indicative of an add-on food delivery service request (e.g., add-on order request 160) from a user 120 (e.g., via service application 167 on a merchant device 165). For example, the user 120 can submit a request through a user device 125 associated with the user (e.g., via a software application 127). A network system 130 associated with a service entity can facilitate a request for services from a user 120. An operations computing system 135 associated with the food delivery service entity can facilitate a request for services from a user 120. For example, the user 120 can submit an add-on food delivery request through a user device 125 associated with the user 120 (e.g., via a software application 127). Operations computing system 135 can receive a food delivery service request for an add-on order request 160 from a user device 125. The operations computing system can send a request to a merchant device 165 associated with a merchant 115B (e.g., via a software application 167). The operations computing system 135 can receive data indicative of a merchant 115B accepting a food preparation request (e.g., food being prepared, estimated preparation time). The operations computing system can send a request to a courier device 110 associated with the courier to complete the add-on order request 160 (e.g., via application 167). In some instances, the courier associated with the primary order request 137 can complete the add-on order request 160. In some instances, the courier associated with the primary order request 137 can be different from the courier associated with the add-on order request 160.

The operations computing system can generate data indicative of the primary order request 137 and/or add-on order request 160 (e.g., estimated time of departure, estimated time of arrival, estimated preparation time, real-time updates on order preparation, real-time updates on order location). The operations computing system 135 can provide data for display on a user device 125 (e.g., via application 127) indicative of updates on the primary order request 137 and/or the add-on order request 160. For example, an update can include an update about what stage of delivery the primary order is in (e.g., preparation, pick-up by courier, courier in route, approaching delivery, delivered). In addition, or alternatively, the update can include an update about what stage of delivery the add-on order is in (e.g., preparation, pick-up by courier, courier in route, approaching delivery, delivered).

An operations computing system 135 associated with the service entity can receive a primary order request 137 from the user device 125. The operations computing system 135 can send a request to a courier device 110 associated with a courier (e.g., via a software application 112) for the courier to perform the requested primary order request service. The courier can be associated with the vehicle (e.g., vehicle 105A-D).

The operations computing system can communicate data indicative of the food delivery service assignment to a courier (e.g., a human courier, an autonomous vehicle courier, an autonomous robot courier). For instance, the operations computing system 135 can send a request to the courier device 110 of the courier. The request (e.g., for the courier to accept the food delivery service assignment) can be communicated to the courier via the software application 112 running on the courier device 110 associated with the courier. Additionally, or alternatively, the operations computing system 135 can send a request to a vehicle device(s) 110 (e.g., a tablet stored onboard the vehicle) of at least one of vehicles 105A-D. The request (for the courier to accept the food delivery service assignment) can be communicated to the courier via the software application 112 running on a courier device 110. The courier can provide user input to the courier device 110 (e.g., via the software application 112) to accept or decline the vehicle service assignment. In some examples, user input can be provided directly into a service application. Additionally, or alternatively, user input can be provided via an application programing interface (API) and/or a third-party application. Data indicative of the acceptance or rejection of the request can be provided to the operations computing system 135.

The systems of FIG. 1 can select one or more merchants as selected merchants using a machine-learned merchant selection model. For example, the systems can use a machine-learned merchant selection model described with reference to FIG. 2, which illustrates a sample machine-learned merchant selection model and method for selecting one or more merchants.

FIG. 2A depicts a block diagram of an example machine-learned merchant selection model 200 according to example implementations of the present disclosure. In some embodiments, the operations computing system 135 can determine one or more selected merchants for the add-on order using a machine-learned merchant selection model that is trained using data gathered by or accessed by the computing system. As illustrated in FIG. 2A, in some implementations, the machine-learned merchant selection model 200 is trained to receive input data of one or more types (e.g., merchant-specific data 205, primary order request data 210, user data 215) and, in response, provide output data of one or more types (e.g., selected merchant information 220). Thus, FIG. 2A illustrates the machine-learned model performing inference.

In some implementations, the input data can include one or more features that are associated with an instance or an example. For example, the input data can include merchant-specific data 205. Merchant-specific data 205 can include category labels 205A, incremental distance 205B, merchant status 205C, food preparation time 205D, rating 205E, delivery-related features 205F, and/or any other merchant-specific data. In some embodiments, the primary order request data 210 can include pick-up location 210A, merchant associated with the request 210B, item for transport 210C, drop-off location 210D, and/or any other data associated with the primary order request 137. In some implementations, the input data can include user data 215. User data 215 can include personal profile information associated with the user and/or historical information associated with previous delivery service order information of the user.

In some implementations, the one or more features associated with the instance or example can be organized into a feature vector. In some implementations, the output data can include one or more predictions. Predictions can also be referred to as inferences. Thus, given features associated with a particular instance, the machine-learned merchant selection model 200 can output a prediction for such instance based on the features.

In some embodiments, the output can include selected merchant information 220. For example, the selected merchant information 220 can include selected merchants 220A, conversion probability 220B, and/or any other data associated with selected merchants.

The machine-learned merchant selection model 200 can be or include one or more of various different types of machine-learned models. In particular, in some implementations, the machine-learned merchant selection model 200 can perform classification, regression, clustering, anomaly detection, recommendation generation, and/or other tasks.

FIG. 2B depicts an example method for using the machine-learned merchant selection model 200 to output selected merchant information 220. For example, at (225) the method can include obtaining merchant-specific data 205, primary order request data 210, and/or user data 215.

At (230), the method can include inputting merchant-specific data 205, primary order request data 210, and/or user data 215 into the machine-learned merchant selection model 200. For example, the user data indicative of the primary order request can include data indicative of (i) a pick-up location, (ii) a merchant associated with the primary order request, (iii) one or more items for transport, and (iv) a drop-off location.

At (235), the method can include receiving selected merchant information, selected merchants, and conversion probability as output from the machine-learned merchant selection model. For example, the conversion probability 220B can be determined based at least in part on a conditional conversion model (e.g., conditional conversion model 145B of FIG. 1).

At (240), the method can include using the selected merchant information to rank the selected merchants and update a graphical user interface to display menu items associated with the selected merchants. The selected merchants can be ranked using a rules-based approach. Additionally, or alternatively, the selected merchants can be ranked using a machine-learned model (e.g., machine-learned merchant ranking model 300 of FIG. 3A).

The systems of FIG. 1 can rank one or more merchants and/or items associated with one or more merchants using a machine-learned ranking model. For example, the systems can use a machine-learned merchant ranking model described with reference to FIG. 3A, which illustrates a sample machine-learned merchant ranking model and method for ranking one or more merchants.

Figure 3A:
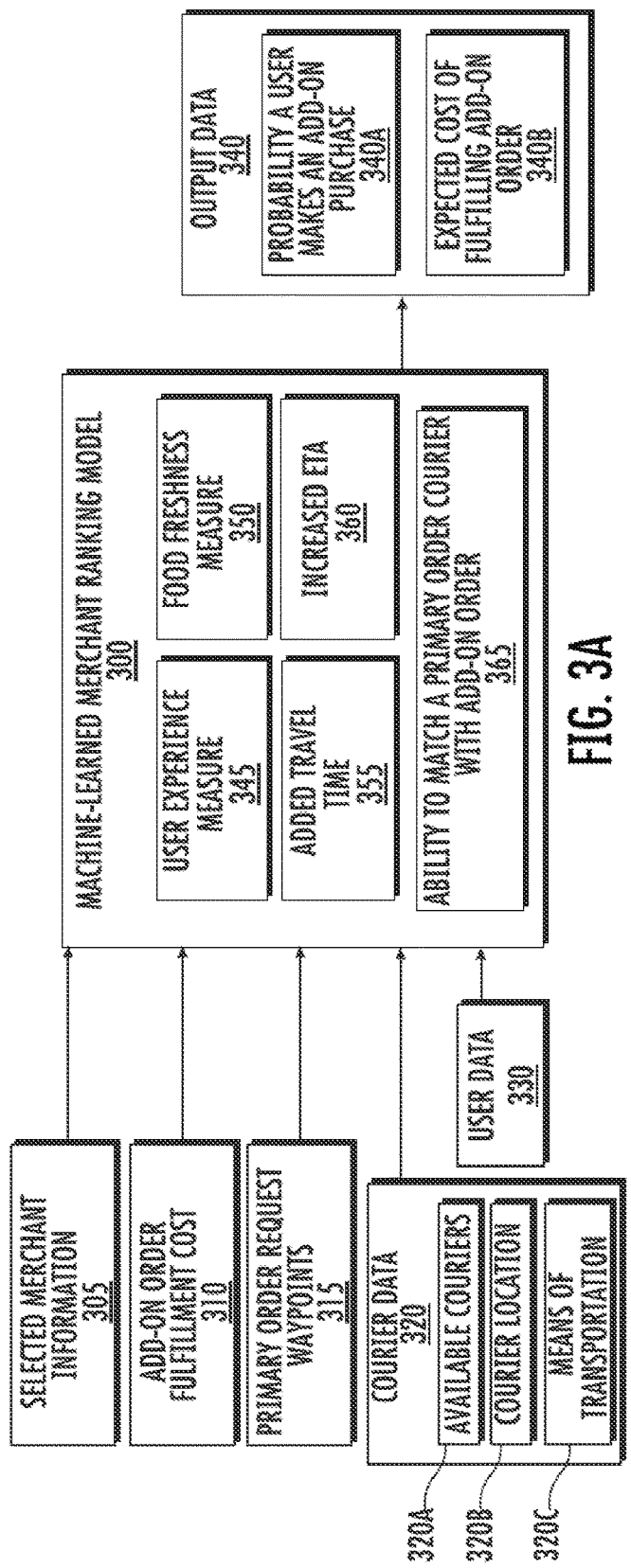
FIGS. 3A-3B depict block diagrams associated with a machine-learned merchant ranking model according to aspects of the present disclosure.

FIG. 3A depicts a block diagram of an example machine-learned merchant ranking model 300 according to example implementations of the present disclosure. In some embodiments, the operations computing system 135 can rank one or more selected merchants for the add-on order 160 using a machine-learned merchant ranking model that is trained using data gathered by the computing system (e.g., computing system 502 or 530 from FIG. 5) or otherwise accessed by the computing system. As illustrated in FIG. 3A, in some implementations, the machine-learned merchant ranking model 300 is trained to receive input data of one or more types (e.g., selected merchant information 305, add-on order fulfillment cost 310, primary order request waypoints 315, courier data 320, user data 325) and, in response, provide output data 340 of one or more types. Thus, FIG. 3A illustrates the machine-learned model performing inference.

In some implementations, the input data can include one or more features that are associated with an instance or an example. The input data can include selected merchant information 305. Selected merchant information 305 can include merchant-specific data. For example, the merchant-specific data can include at least one of (i) one or more category labels, (ii) an incremental distance, (iii) a merchant status, (iv) a food preparation time, (v) one or more ratings, or (vi) delivery-related features. One or more category labels can include a machine-learning based prediction of one or more cuisine types of a respective merchant of the one or more candidate merchants. Additionally, or alternatively, one or more category labels can be determined based on user input from one or more merchants self-identifying as a particular category. In some examples, user input can be provided directly into a service application. Additionally, or alternatively, user input can be provided via an application programing interface (API) and/or a third-party application. Categories can include, for example dessert, beverage, convenience, alcohol, etc. An incremental distance can include at least one of an incremental haversine distance or an incremental estimated time of arrival. A merchant status can include at least one of a first status indicative of a respective merchant accepting orders or a second status indicative of a respective merchant not accepting orders.

For example, the input data can include add-on order fulfillment cost 310. In some embodiments fulfillment cost can be determined. The cost of fulfilling the add-on order can be determined based at least in part on at least one of (i) a user experience measure 345, (ii) a food freshness measure 350, (iii) an added travel time 355, (iv) an increased estimated time of arrival 360, or (v) an ability to match a primary order courier with the add-on order 365. A user experience measure can be any measure associated with a user's expectation for the associated food delivery service (e.g., experience by the food delivery requests). For example, a user experience measure can include a user's tolerance for an increase in estimated time of arrival for an order. In some implementations, the user experience measure can take into account an offset value indicating other actions that can be taken to maintain a favorable user experience. For example, the offset can include a discount or promotion for placing an add-on order, an incentive for an operator to complete an add-on order request associated with a primary order request, etc. The increased estimated time of arrival 360 can be determined using a departure prediction model. The departure prediction model can, for example, output a predicted preparation time for a primary merchant and add-on merchant pair. In some instances, the departure prediction model can include a machine-learned departure prediction model. The machine-learned departure prediction model can directly predict the cost of fulfilling an order that comprises a match between the primary order and a respective add-on merchant and/or add-on menu item pair.

Input data can include conditional demand. For example, conditional demand can vary based on data indicative of the primary order, data indicative of the add-on order, user data, and/or environmental data (e.g., weather, traffic). The model can be continually reiterated to allow for improvement. For example, if a primary order is from a merchant that serves primarily coffee, a user may be less likely to complete an add-on order for another merchant that serves primarily coffee. A user may also be less likely to complete an add-on order for a merchant that is the same brand as the primary order but at a different location. In addition, or alternatively, conditional demand can be indicative of a user being more likely to complete an add-on order in light of a primary order. For example, a primary order can include an order for pizza on a Friday night. Conditional demand can indicate that users are generally more likely to complete an add-on order for an alcoholic beverage in light of a primary order for pizza and/or an order being placed on a Friday night. The conditional demand model (e.g., conditional conversion model 150B of FIG. 1) can be trained using data (e.g., from data repository 155 of FIG. 1) to better predict the demand and conversions of particular merchants and/or items for add-on orders given various inputs (e.g., data indicative of the primary order request, user data, environmental data, contextual data).

For example, the input data can include primary order request waypoints 315. Primary order request waypoints can include a pick-up location associated with the primary order request and/or a drop-off location associated with the primary order request. The primary order request waypoints 315 can be used to determine an expected route (e.g., Potential Route A 805, Potential Route B 810 of FIG. 8). The waypoints can be used to determine incremental distance for an add-on order (e.g., determine whether one or more candidate add-on merchants are located along the expected route or if the add-on merchant(s) are located farther away).

For example, the input data can include courier data 320. Courier data can include available couriers 320A (e.g., a courier that is online with a service entity), courier locations 320B (e.g., a current location, an expected location), means of transportation 320C (e.g., a pedestrian courier with a smaller radius of travel, a bike, a car), and/or any data associated with a courier.

For example, the input data can include user data 330. User data can include historical data associated with the user and/or a user account associated with the food delivery service entity. The food delivery service entity can be connected with one or more additional service entities (e.g., ride-share entity). Data associated with one or more user accounts linked to the user and the one or more additional service entities can be pulled (with user permission) to determine user preferences. For example, data can include restaurants that a user regularly orders from, items that a user regularly orders, restaurants that a user is frequently dropped off to, etc.

In some implementations, input data can include output data from one or more models. The one or more models can include machine-learned models (e.g., machine-learned merchant selection model 200), statistical models, or any other models. For example, the input data can include another model's output including eligible merchants (e.g., selected merchants) and order data (e.g., primary order request data). In some examples, an input can include a likelihood that a user that has made a primary order with specific characteristics is likely to place an add-on order with a specific candidate add-on merchant (e.g., selected add-on merchant). If the likelihood that the user will place an add-on order with a specific candidate add-on merchant is above a threshold, this factor can indicate that the add-on merchant should be ranked higher than a candidate add-on merchant with a likelihood below the threshold.

In some implementations, the one or more features associated with the instance or example can be organized into a feature vector. In some implementations, the output data can include one or more predictions. Predictions can also be referred to as inferences. Thus, given features associated with a particular instance, the machine-learned merchant ranking model 300 can output a prediction for such instance based on the features.

The machine-learned merchant ranking model 300 can predict outputs based at least in part of determining the cost of fulfilling the add-on order. For example, the cost of fulfilling the add-on order can be determined based at least in part on at least one of (i) likelihood of conversion, (ii) a cost of fulfilling the add-on order, (iii) one or more waypoints associated with the primary order request, or (iv) one or more available transportation modes. In some embodiments, the likelihood of conversion can be a probability of fulfilling an add-on order associated with a selected merchant. In some examples, the ranking can include obtaining an output from the machine-learned ranking model indicative of a probability that the user will complete the add-on order purchase and/or an expected cost of fulfilling the add-on order purchase.

In some embodiments, the output can include output data 340. For example, the output data can include probability a user completes an add-on purchase 340A and expected cost of fulfilling add-on order 340B.

The machine-learned merchant ranking model 300 can be or include one or more of various different types of machine-learned models. In particular, in some implementations, the machine-learned merchant ranking model 300 can perform classification, regression, clustering, anomaly detection, recommendation generation, and/or other tasks. In some implementations, the machine-learned models can include one or more deep learning models. For example, the one or more deep learning models can include conversion rate (CVR), Deep Native Instruments (NI) and/or Service Quality models. For example, the operations computing system can include a plurality of models. The plurality of models can generate an output. For example, a Deep CVR model can predict an add-on conversion. For example, a Deep NI and Service Quality model can predict a predicted NI and a predicted service quality based on one or more inputs. The outputs of each of the respective models and be combined to generate a final output. The final output can include a ranking of one or more add-on merchants and/or add-on menu items. The ranking can be a ranking of one or more merchants and/or one or more items associated with each respective merchant. The system can generate data indicative of the ranking of one or more merchants and/or one or more items associated with each respective merchant and provide that data for display via a graphical user interface associated with a user device (e.g., user device 125).

Figure 3B:
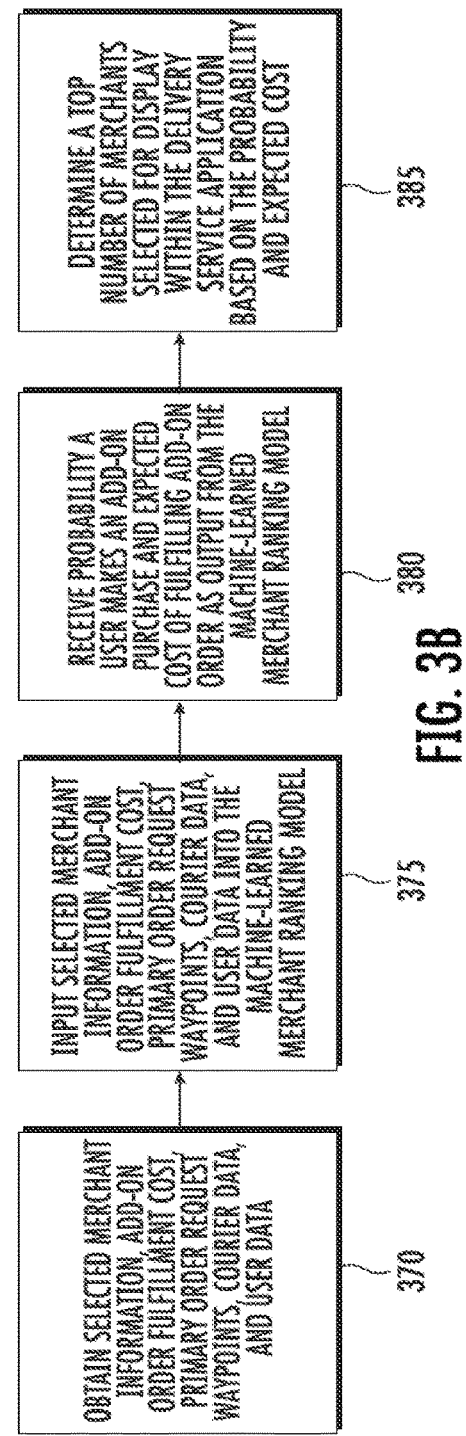

FIG. 3B depicts an example method for using the machine-learned merchant ranking model 300 to output a probability that a user completes an add-on purchase 340A and an expected cost of fulfilling an add-on order 340B. For example, at (370) the method can include obtaining selected merchant information 305, add-on order fulfillment cost 310, primary order request waypoints 315, courier data 320, and user data 330.

At (375), the method can include inputting selected merchant information, add-on order fulfillment cost, primary order request waypoints, courier data, and/or user data into the machine-learned merchant ranking model 300.

At (380) the method can include receiving a probability that a user completes an add-on purchase and expected cost of fulfilling the add-on order as output from the machine-learned merchant ranking model. In determining the output of the model, the model can consider various factors for weighting including user experience measure 345, food freshness measure 350, added travel time 355, increased estimated time of arrival 360, ability to match a primary order courier with an add-on order 365, etc.

At (385) the method can include determining a top number of merchants and/or items associated with selected merchants for display within the delivery service application on the user device based on the probability a user makes an add-on purchase and the expected cost of fulfilling the add-on order.

In some implementations, the machine-learned models described herein can be trained at a training computing system and then provided for storage and/or implementation at one or more computing devices, as described above. For example, a model trainer can be located at the training computing system. The training computing system can be included in or separate from the one or more computing devices that implement the machine-learned model. In some implementations, the model can be trained in an offline fashion or an online fashion. In offline training (also known as batch learning), a model is trained on the entirety of a static set of training data. In online learning, the model is continuously trained (or re-trained) as new training data becomes available (e.g., while the model is used to perform inference).

In some implementations, the model trainer can perform centralized training of the machine-learned models (e.g., based on a centrally stored dataset). In other implementations, decentralized training techniques such as distributed training, federated learning, or the like can be used to train, update, or personalize the machine-learned models.

The machine-learned models described herein can be trained according to one or more of various different training types or techniques. For example, in some implementations, the machine-learned models can be trained using supervised learning, in which the machine-learned model is trained on a training dataset that includes instances or examples that have labels. The labels can be manually applied by experts, generated through crowd-sourcing, or provided by other techniques (e.g., by physics-based or complex mathematical models). In some implementations, if the user has provided consent, the training examples can be provided by the user computing device. In some implementations, this process can be referred to as personalizing the model.

Figure 4:
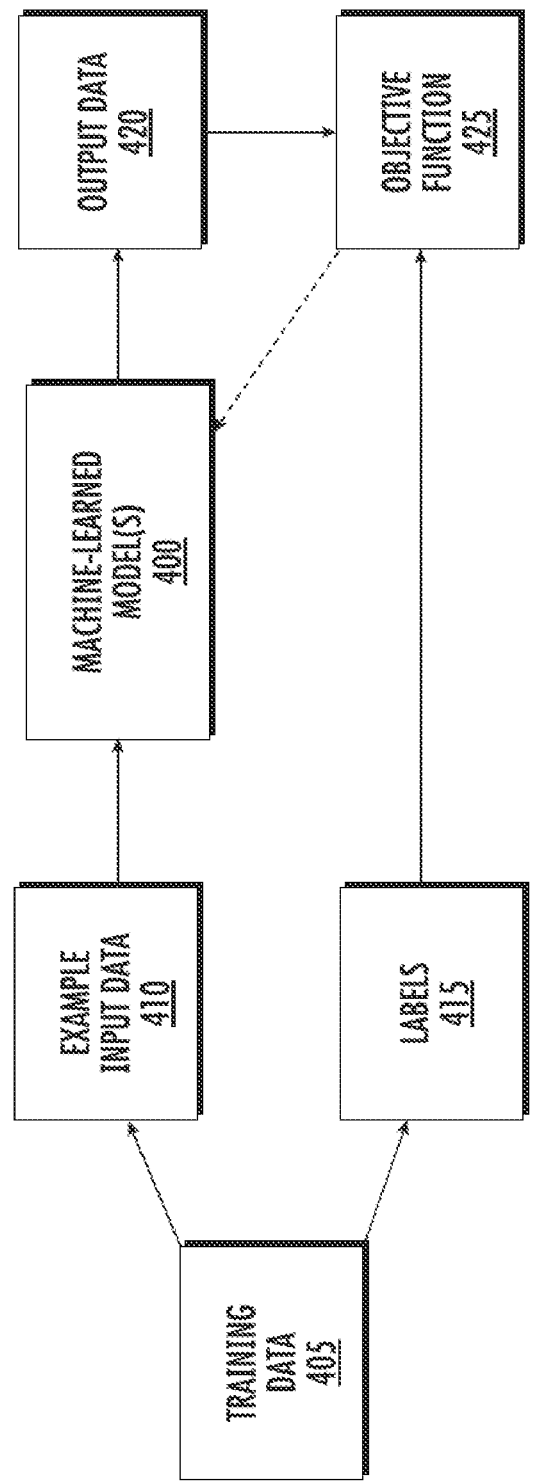
FIG. 4 depicts a block diagram of training one or more machine-learned models according to example embodiments of the present disclosure.

As one example, FIG. 4 illustrates a block diagram of an example training process in which a machine-learned model 400 is trained on training data 405 that includes example input data 410 that has labels 415. Training processes other than the example process depicted in FIG. 4 can be used as well.

In some implementations, training data 405 can include examples of the input data 410 that have been assigned labels 415 that correspond to the output data 420. For example, determining the selected merchants can be performed using a machine-learned merchant selection model that is trained using merchant selection training data gathered by the computing system. This merchant selection training data can include data associated with the merchants. The data associated with the merchants can include category labels (e.g., machine learning based prediction of cuisine type), incremental distance (e.g., incremental haversine distance, incremental ETA), merchant status (e.g., accepting orders or not accepting orders), food preparation time (e.g., for each individual item), rating, and/or delivery-related features.

In some implementations, during training, the input training data can be intentionally deformed in any number of ways to increase model robustness, generalization, or other qualities. Example techniques to deform the training data include adding noise; changing color, shade, or hue; magnification; segmentation; amplification; etc.

In some implementations, the machine-learned model 400 can be trained by optimizing an objective function 425. For example, in some implementations, the objective function 425 can be or include a loss function that compares (e.g., determines a difference between) output data generated by the model from the training data 405 and labels 415 (e.g., ground-truth labels) associated with the training data 405. For example, the loss function can evaluate a sum or mean of squared differences between the output data and the labels. As another example, the objective function 425 can be or include a cost function that describes a cost of a certain outcome or output data 420. Other objective functions can include margin-based techniques such as, for example, triplet loss or maximum-margin training.

One or more of various optimization techniques can be performed to optimize the objective function 425. For example, the optimization technique(s) can minimize or maximize the objective function 425. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train a model (e.g., a multi-layer model such as an artificial neural network). For example, an iterative cycle of propagation and model parameter (e.g., weights) update can be performed to train the model. Example backpropagation techniques include truncated backpropagation through time, Levenberg-Marquardt backpropagation, etc.

In some implementations, the machine-learned models described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

In some implementations, the machine-learned models described herein can be trained using semi-supervised techniques which combine aspects of supervised learning and unsupervised learning.

In some implementations, the machine-learned models described herein can be trained or otherwise generated through evolutionary techniques or genetic algorithms.

In some implementations, the machine-learned models described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor sub-optimal actions explicitly corrected.

In some implementations, one or more generalization techniques can be performed during training to improve the generalization of the machine-learned model. Generalization techniques can help reduce overfitting of the machine-learned model to the training data. Example generalization techniques include dropout techniques; weight decay techniques; batch normalization; early stopping; subset selection; stepwise selection; etc.

In some implementations, the machine-learned models described herein can include or otherwise be impacted by a number of hyperparameters, such as, for example, learning rate, number of layers, number of nodes in each layer, number of leaves in a tree, number of clusters; etc. Hyperparameters can affect model performance. Hyperparameters can be hand selected or can be automatically selected through application of techniques such as, for example, grid search; black box optimization techniques (e.g., Bayesian optimization, random search); gradient-based optimization; etc. Example techniques and/or tools for performing automatic hyperparameter optimization include Hyperopt; Auto-WEKA; Spearmint; Metric Optimization Engine (MOE); etc.

In some implementations, various techniques can be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of the machine-learned models described herein.

Figure 5:
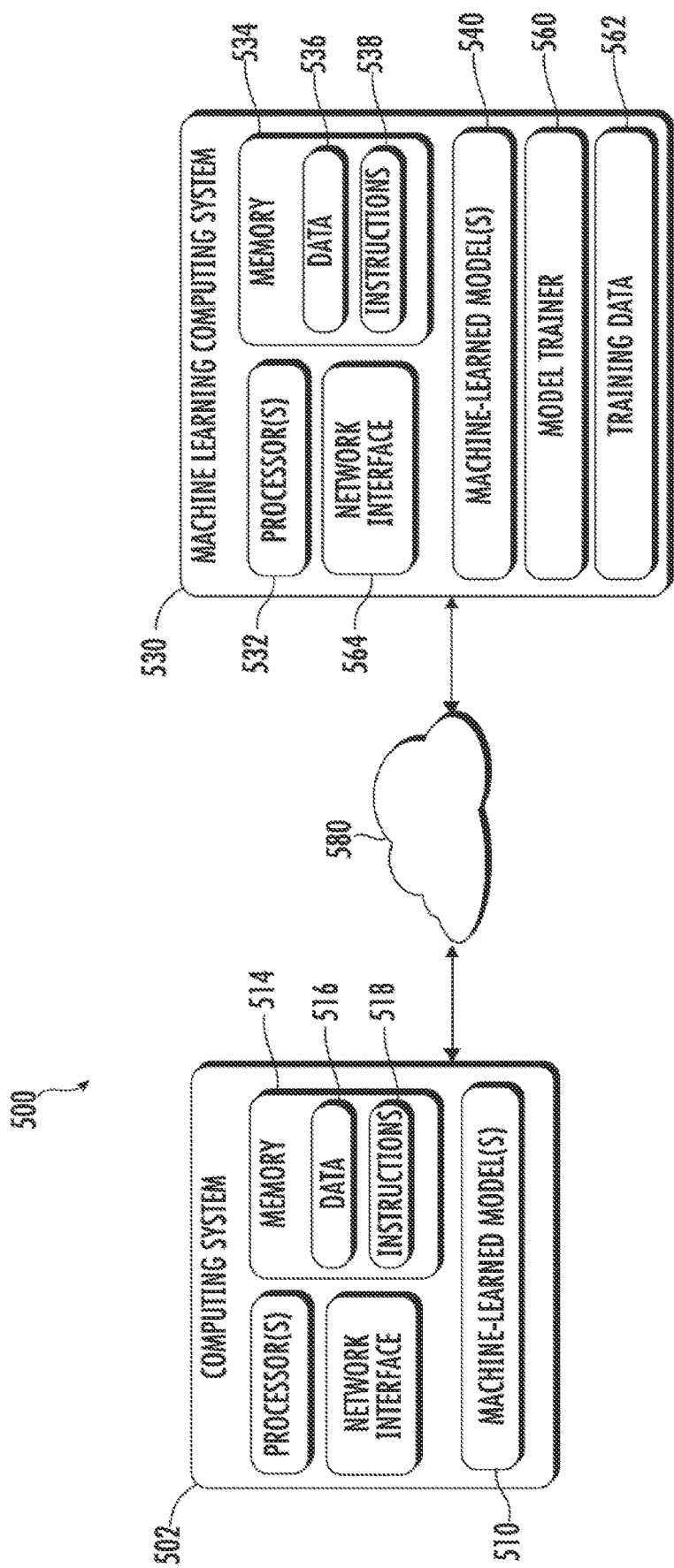
FIG. 5 depicts an example network including a network computing system and machine learning computing system according to example embodiments of the present disclosure.

FIG. 5 depicts a block diagram of an example computing system 500 according to example embodiments of the present disclosure. The example system 500 includes a computing system 502 and a machine learning computing system 530 that are communicatively coupled over a network 580.

In some implementations, the computing system 502 can perform dynamic suggestions of add-on orders for primary orders. In some implementations, the computing system 502 can be included in a device associated with a food delivery service entity. In some instances, the computing system 502 can operate offline to perform dynamic suggestions of add-on orders through selecting merchants and/or menu items associated with merchants to display as add-on order suggestions to a user. The computing system 502 can include one or more distinct physical computing devices.

The computing system 502 includes one or more processors 512 and a memory 514. The one or more processors 512 can be any suitable processing device (e.g., a processor core, a microprocessor, an ASIC, a FPGA, a controller, a microcontroller) and can be one processor or a plurality of processors that are operatively connected. The memory 514 can include one or more non-transitory computer-readable storage media, such as RAM, ROM, EEPROM, EPROM, one or more memory devices, flash memory devices, etc., and combinations thereof.

The memory 514 can store information that can be accessed by the one or more processors 512. For instance, the memory 514 (e.g., one or more non-transitory computer-readable storage mediums, memory devices) can store data 516 that can be obtained, received, accessed, written, manipulated, created, and/or stored. The data 516 can include, for instance, data indicative of the add-on display, data indicative of the primary order, data indicative of the primary merchant, data indicative of the add on merchant, data indicative of primary and add-on merchant pairs, and user data. In addition, or alternatively the data 516 can include, for instance data associated with a pre-trip prediction (e.g., pre-trip estimated time of preparation and arrival to a requesting user), order context related (e.g., of the primary and add-on order), primary merchant related data (e.g., close parking available, predicted wait time for a courier to pick-up an order), add-on merchant related data (e.g., close parking available, predicted wait time for a courier to pick-up an order), and/or drop-off location related data (e.g., ease of accessing drop of location, accessible parking, drop-off at a door, hand-off to a user).

Data indicative of the add-on order display can include where the add-on merchant appears and the ranking of the add-on merchant, features of the add-on merchant that are displayed (e.g., images), and/or the "version" of the design/notification being displayed (e.g., with/without a category, with/without images). The data indicative of the primary order can include basket size (e.g., total cost), number of items, post-checkout preparation time (e.g., estimated time of departure), and/or context data (e.g., time of day, meal period, pick-up/drop-off location, distance). The data indicative of the primary merchant can include cuisine types, basic information (e.g., location, ratings, promotions, preparation time), average price, average basket size, order counts, and/or aggregated order related features (e.g., prep time for a plurality of items).

The data indicative of the add-on merchant can include cuisine types, basic information (e.g., location, ratings, promotions, preparation time), average price, average basket size, order counts, and/or aggregated order related features (e.g., prep time for a plurality of items). The data indicative of primary and add-on merchant pairs can include embedding features that capture complementarity between a particular add-on merchant and primary merchant pair. Targets can include obtaining data of whether a user completes an add-on order conversion for a particular add-on merchant (e.g., and the basket size of the add-on order), if the user taps on an add-on merchant (e.g., views the store), and/or an impression of the add-on merchant to the user (e.g., the user views the add-on merchant and/or add-on menu items). In some implementations, the computing system 502 can obtain data from one or more memory device(s) that are remote from the system 502.

The memory 514 can also store computer-readable instructions 518 that can be executed by the one or more processors 512. The instructions 518 can be software written in any suitable programming language or can be implemented in hardware. Additionally, or alternatively, the instructions 518 can be executed in logically and/or virtually separate threads on processor(s) 512.

Figure 9:
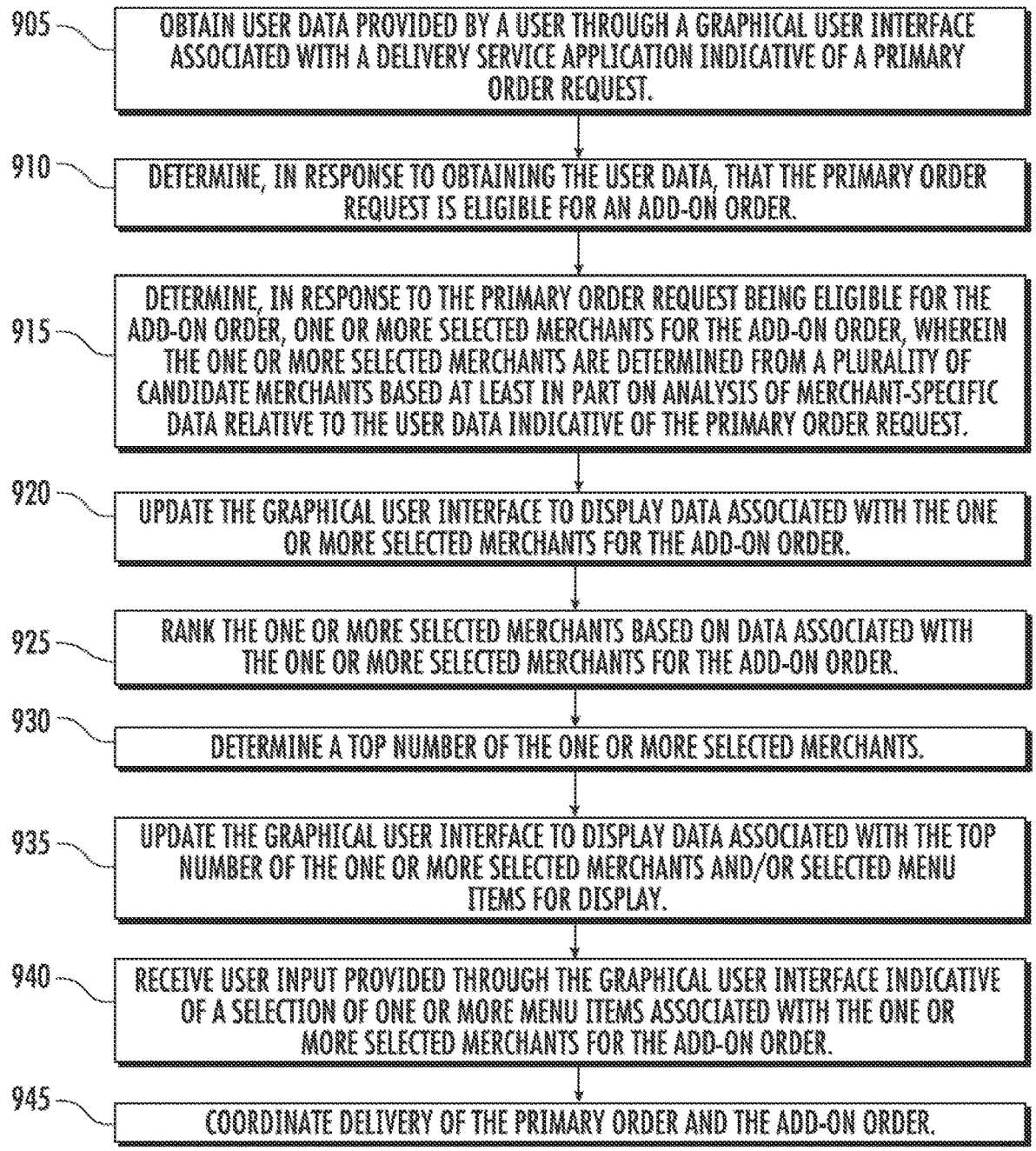
FIG. 9 depicts a flowchart of an example method according to example embodiments of the present disclosure.

For example, the memory 514 can store instructions 518 that when executed by the one or more processors 512 cause the one or more processors 512 to perform any of the operations and/or functions described herein, including, for example, operations 905-945 of FIG. 9.

According to an aspect of the present disclosure, the computing system 502 can store or include one or more machine-learned models 510. As examples, the machine-learned models 510 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, the computing system 502 can receive the one or more machine-learned models 510 from the machine learning computing system 530 over network 580 and can store the one or more machine-learned models 510 in the memory 514. The computing system 502 can then use or otherwise implement the one or more machine-learned models 510 (e.g., by processor(s) 512). In particular, the computing system 502 can implement the machine-learned model(s) 510 to perform merchant ranking and/or fulfillment cost prediction. For example, in some implementations, the computing system 502 can employ the machine-learned model(s) 510 by inputting multiple time frames of sensor data (e.g., sensor data 452 of FIG. 6) into the machine-learned model(s) 510 and receiving output data (e.g., output data 456 of FIG. 6) as an output of the machine-learned model(s) 510.

The machine learning computing system 530 includes one or more processors 532 and a memory 534. The one or more processors 532 can be any suitable processing device (e.g., a processor core, a microprocessor, an ASIC, a FPGA, a controller, a microcontroller) and can be one processor or a plurality of processors that are operatively connected. The memory 534 can include one or more non-transitory computer-readable storage media, such as RAM, ROM, EEPROM, EPROM, one or more memory devices, flash memory devices, etc., and combinations thereof.

The memory 534 can store information that can be accessed by the one or more processors 532. For instance, the memory 534 (e.g., one or more non-transitory computer-readable storage mediums, memory devices) can store data 536 that can be obtained, received, accessed, written, manipulated, created, and/or stored. The data 536 can include, for instance, category labels (e.g., machine learning based prediction of cuisine type), incremental distance (e.g., incremental haversine distance, incremental ETA), merchant status (e.g., accepting orders or not accepting orders), food preparation time (e.g., for each individual item), rating, and/or delivery-related features. In some implementations, the machine learning computing system 530 can obtain data from one or more memory device(s) that are remote from the system 530.

The memory 534 can also store computer-readable instructions 538 that can be executed by the one or more processors 532. The instructions 538 can be software written in any suitable programming language or can be implemented in hardware. Additionally, or alternatively, the instructions 538 can be executed in logically and/or virtually separate threads on processor(s) 532.

For example, the memory 534 can store instructions 538 that when executed by the one or more processors 532 cause the one or more processors 532 to perform any of the operations and/or functions described herein, including, for example, operations 905-945 of FIG. 9.

In some implementations, the machine learning computing system 530 includes one or more server computing devices. If the machine learning computing system 530 includes multiple server computing devices, such server computing devices can operate according to various computing architectures, including, for example, sequential computing architectures, parallel computing architectures, or some combination thereof.

In addition, or alternatively to the model(s) 510 at the computing system 502, the machine learning computing system 530 can include one or more machine-learned models 540. As examples, the machine-learned models 540 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

As an example, the machine learning computing system 530 can communicate with the computing system 502 according to a client-server relationship. For example, the machine learning computing system 530 can implement the machine-learned models 540 to provide a web service to the computing system 502. For example, the web service can provide an autonomous vehicle motion planning service.

Thus, machine-learned models 510 can be located and used at the computing system 502 and/or machine-learned models 540 can be located and used at the machine learning computing system 530.

In some implementations, the machine learning computing system 530 and/or the computing system 502 can train the machine-learned models 510 and/or 540 through use of a model trainer 560. The model trainer 560 can train the machine-learned models 510 and/or 540 using one or more training or learning algorithms. One example training technique is backwards propagation of errors. In some implementations, the model trainer 560 can perform supervised training techniques using a set of labeled training data. In other implementations, the model trainer 560 can perform unsupervised training techniques using a set of unlabeled training data. The model trainer 560 can perform a number of generalization techniques to improve the generalization capability of the models being trained. Generalization techniques include weight decays, dropouts, or other techniques.

In particular, the model trainer 560 can train a machine-learned model 510 and/or 540 based on a set of training data 562. The training data 562 can include, for example, a plurality of sets of ground truth data, each set of ground truth data including a first portion and a second portion. For example, the training data 562 can include a large number of previously obtained add-on orders paired with primary order requests. The data can include features of the primary order, add-on order, user, courier, merchant, etc.

In one implementation, the training data 562 can include a first portion of data corresponding to instances of an add-on order being placed, an add-on order not being placed, and/or a user interacting with suggested merchants and/or items for add-on orders. The data can be labeled indicating if an add-on order was or was not place and/or if the user interacted with one or more suggested items (and information about the interaction, e.g., length of viewing, data associated with the one or more items viewed). The labels included within the second portion of data within the training data 562 can be manually annotated, automatically annotated, or annotated using a combination of automatic labeling and manual labeling.

In some implementations, to train the machine-learned model (e.g., machine-learned model(s) 510 and/or 540), model trainer 560 can input a first portion of a set of ground-truth data (e.g., the first portion of the training data 562 corresponding to the one or more representations of add-on order conversions) into the machine-learned merchant selection model and/or machine-learned ranking models (e.g., machine-learned model(s) 510 and/or 540) to be trained. In response to receipt of such first portion, the machine-learned merchant selection model outputs selected merchants and conversion probabilities. In response to receipt of such first portion, the machine-learned merchant ranking model outputs a probability that a user completes an add-on purchase and an expected cost of fulfilling an add-on order. This output of the machine-learned models predicts the remainder of the set of ground-truth data (e.g., the second portion of the training dataset). After such prediction, the model trainer 560 can apply or otherwise determine a loss function that compares the output data of the one or more machine-learned models (e.g., machine-learned models 510 and/or 540) to the remainder of the ground-truth data which the models attempted to predict. The model trainer 560 then can backpropagate the loss function through the model(s) (e.g., machine-learned model(s) 510 and/or 540) to train the model(s) (e.g., by modifying one or more weights associated with the model(s)). This process of inputting ground-truth data, determining a loss function, and back-propagating the loss function through the model can be repeated numerous times as part of training the model. For example, the process can be repeated for each of numerous sets of ground-truth data provided within the training data 562. The model trainer 560 can be implemented in hardware, firmware, and/or software controlling one or more processors.

The computing system 502 can also include a network interface 524 used to communicate with one or more systems or devices, including systems or devices that are remotely located from the computing system 502. The network interface 524 can include any circuits, components, software, etc. for communicating with one or more networks (e.g., 580). In some implementations, the network interface 524 can include, for example, one or more of a communications controller, receiver, transceiver, transmitter, port, conductors, software, and/or hardware for communicating data. Similarly, the machine learning computing system 530 can include a network interface 564.

The network(s) 580 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 580 can be accomplished, for instance, via a network interface using any type of protocol, protection scheme, encoding, format, packaging, etc.

FIG. 5 illustrates one example computing system 500 that can be used to implement the present disclosure. Other computing systems can be used as well. For example, in some implementations, the computing system 502 can include the model trainer 560 and the training dataset 562. In such implementations, the machine-learned models 510 can be both trained and used locally at the computing system 502. As another example, in some implementations, the computing system 502 is not connected to other computing systems.

In addition, components illustrated and/or discussed as being included in one of the computing systems 502 or 530 can instead be included in another of the computing systems 502 or 530. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Figure 6A:
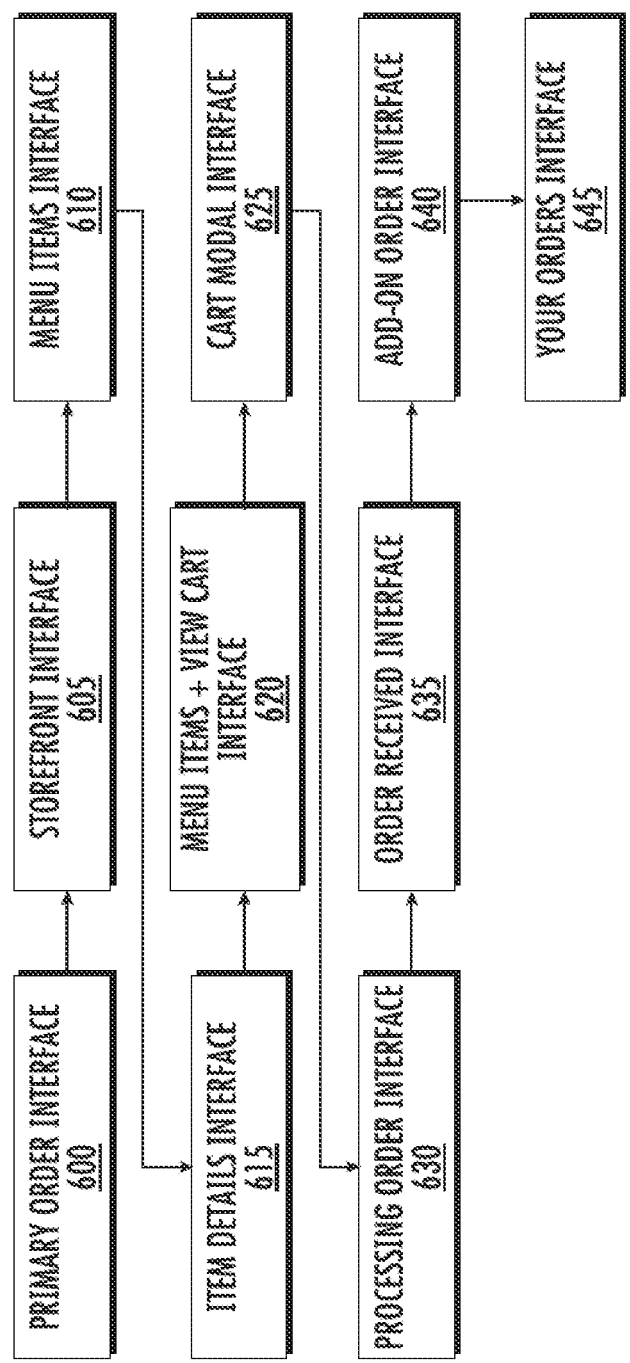
FIG. 6A depicts a flow diagram through various user interfaces according to example embodiments of the present disclosure.
Figure 6B:
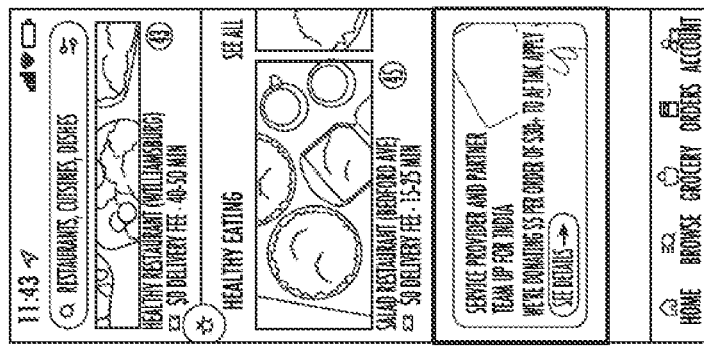
FIGS. 6B-6D depict graphical representations of various user interfaces from the flow diagram of FIG. 6A according to example embodiments of the present disclosure.
Figure 6B:
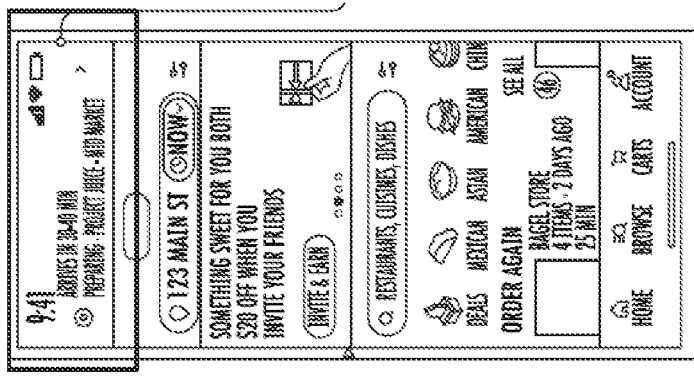
Figure 6B:
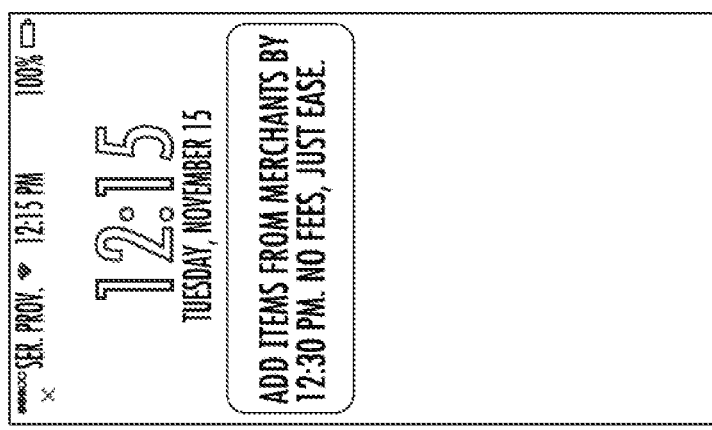
Figure 6B:
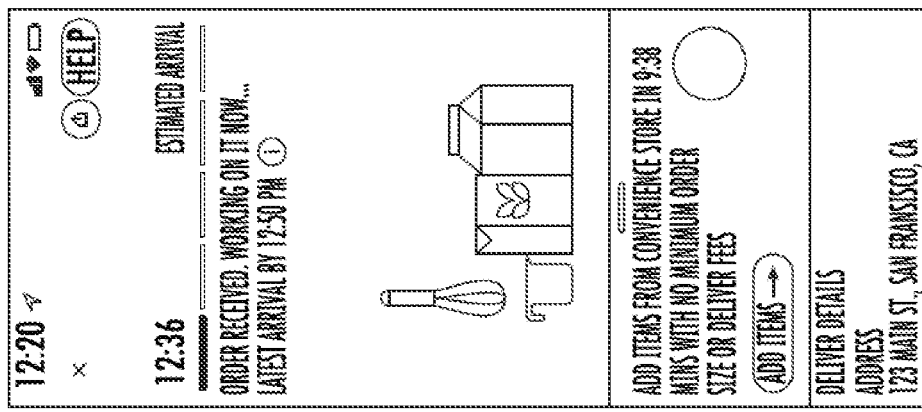
Figure 6C:
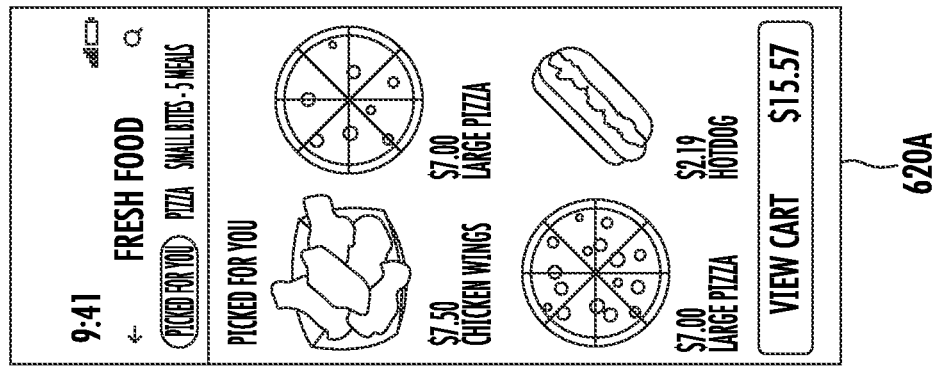
Figure 6C:
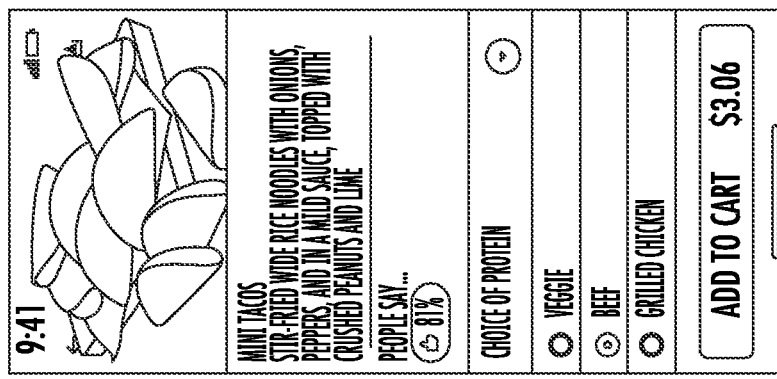
Figure 6C:
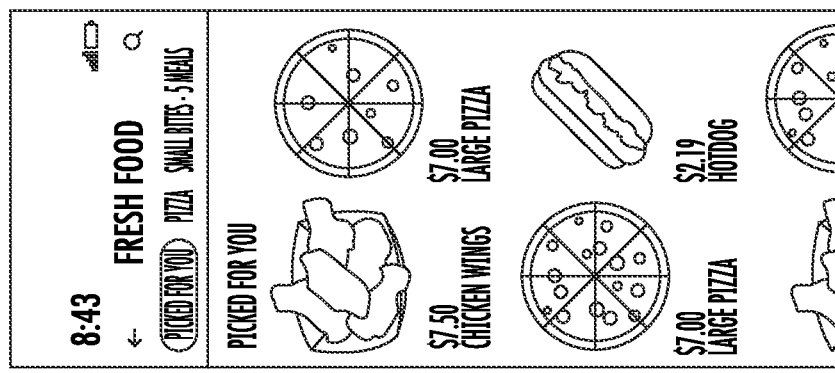
Figure 6C:
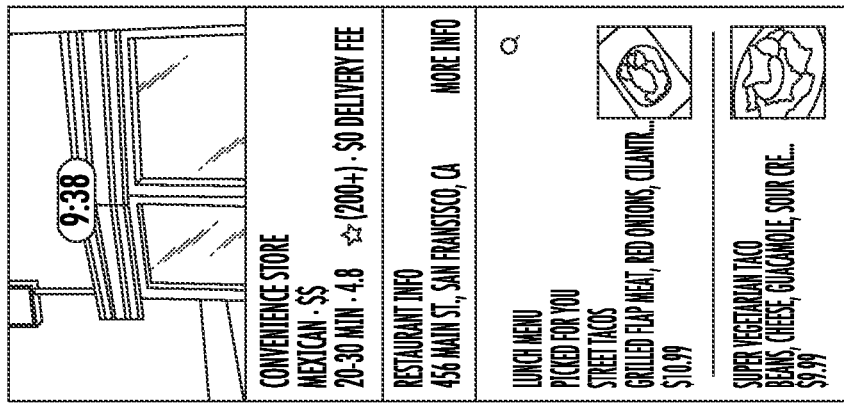
Figure 6D:
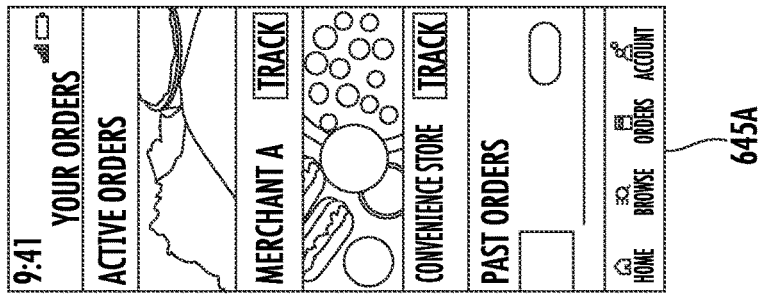
Figure 6D:
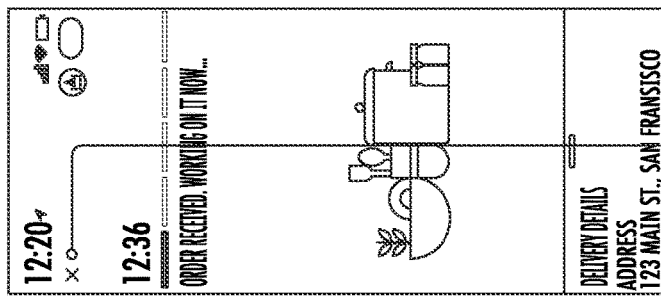
Figure 6D:
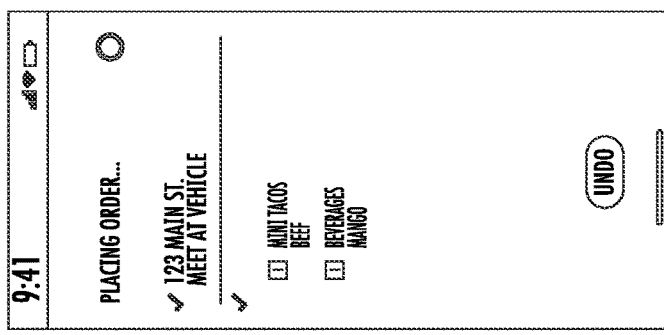
Figure 6D:
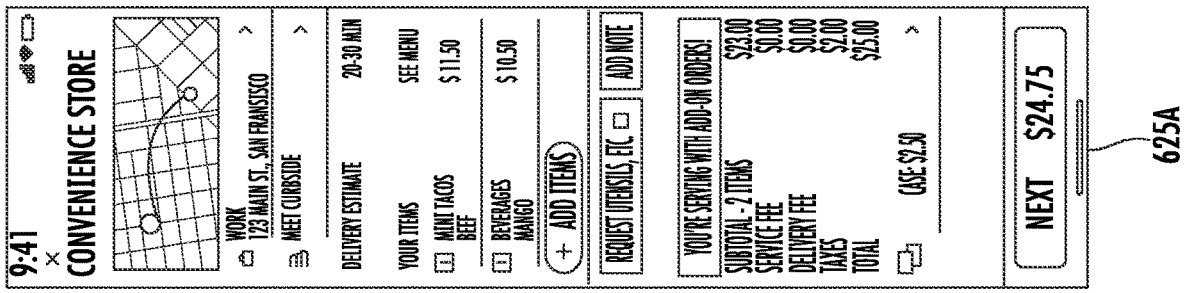

FIG. 6A depicts a block diagram illustrating a series of interfaces that can be provided for display on a graphical user interface (e.g., via user device 125). FIGS. 6B-D depict various example user interfaces for the various blocks in the block diagram of FIG. 6A. For example, the graphical user interfaces can include a primary order interface 600 (e.g., of the primary order request), storefront interface 605, menu items interface 610, item details interface 615, menu items+ view cart interface 620, cart modal interface 625, processing order interface 630, order received interface 635, add-on order interface 640, and your orders interface 645. The graphical user interfaces can be provided for display in response to various points in the delivery service ordering process coordinated by network computing system (e.g., network system 130 of FIG. 1).

For example, the computing system can obtain user data provided by a user through a graphical user interface associated with a delivery service application. The user data can be indicative of a primary order request. In response to obtaining the user data, the system can determine that the primary order request is eligible for an add-on order. For example, the primary order request can be displayed as the primary order interface 600. In response to the primary order request being eligible for the add-on order, the system can determine one or more selected merchants for the add-on order (e.g., via the machine-learned merchant selection model described in FIGS. 2A-2B). The one or more selected merchants can be determined from a plurality of candidate merchants based at least in part on analysis of merchant-specific data relative to the user data indicative of the primary order request. The graphical user interface can be updated to display data associated with the one or more selected merchants for the add-on order.

The primary order interface 600 can include a notification that the primary order is eligible for an add-on order. For example, the interface can comprise a notification incorporated within the order preparation screen as depicted in FIG. 6B. In some instances, the notification can include data indicative of one or more eligible merchants, a timer for placing the add-on order, and/or a content item indicative of a promotion and/or benefit of placing an add-on order (e.g., zero delivery fee, discount, zero service fee). The timer for placing the add-on order can be indicative of an offer window time. The offer window time can be a time within which the user must place the add-on order. The offer window can be determined. In some embodiments, the user interface can be updated to display the offer window. In some embodiments, the merchant selection model can determine the offer window (e.g., via a machine-learned model, a rules-based model, etc.). The content item can also be provided for display via a push notification on a user device. For example, as depicted in 600B, the content item can be a notification on a lock screen. The notification can include the same information as that in the notification in 600A. The notification can include information including a time by which an add-on order must be placed (e.g., offer window, a timer, a specific time), one or more eligible merchants and/or items, and/or a promotion for placing an add-on order. Additionally, or alternatively, the notification can comprise a banner notification as depicted in 600C. The notification can comprise at least one of eligibility of the primary order for an add-on order, selected merchants for the add-on order, timing associated with placing the add-on order, and/or a promotion associated with the placement of an add-on order. Additionally, or alternatively, the notification can be imbedded in a dynamic portion of a user interface (e.g., a rolling banner that cycles through various content items). For example, the computing system can determine a placement of the one or more merchants and/or menu items. The placement can include a ranked listing of one or more merchants and/or items. Additionally, or alternatively, merchants and/or menu items can be displayed as part of a category. The data provided for display can include SKU images of merchant logos and/or items available for an add-on order. The images for display can be selected based on user data and likelihood of user interaction with an item based on the chosen image. The one or more categories can be chosen based on one or more category labels. For example, category labels can include desserts (e.g., bakery, ice cream, snacks), drinks (e.g., coffee, juice, bubble tea), convenience (e.g., grocery, gas station), and/or alcohol. The notification (e.g., content for display) can include one or more potential configurations. For instance, the notification can include a category of the menu item and/or merchant. The notification can exclude a category of the menu item and/or merchant. In some implementations the notification can include an image associated with a menu item and/or merchant. The notification can be presented without an image associated with a menu item and/or merchant.

For example, the system can provide for display one or more storefront interfaces (e.g., storefront interface 605). The storefront interface can comprise one or more selected merchants that are eligible for an add-on order. By way of example, a storefront interface can comprise an interface like the interface illustrated by 605A. This can include details about a merchant. For example, the information can include at least one of an image associated with a merchant, an image associated with one or more menu items, category information, location information, one or more menu items, price associated with menu items, and/or any other merchant associated data. A user can provide input indicating the selection of a merchant for an add-on order. The format of the display can be based on a variety of factors. For example, the number of items to display, the images available, and/or surfacing one or more items intelligently within a merchant. While the add-on order notifications have been described as surfacing after a primary order has been placed, add-on orders can be displayed in response to a user adding one or more items for a primary order. For example, a user could select items from a plurality of merchants. In response to the user selecting an item for a primary order, an add-on order item can be suggested to add to the same cart as the primary order menu items. While the present disclosure has recited various implementations relating to comestible items, menu items can comprise any item which can be transported (e.g., food, clothing, beverage, jewelry, household items, office items, plants, pharmacy items, construction materials, and/or any other item).

In response to obtaining user input indicative of selection of a particular merchant, the system can provide for display a menu item interface (e.g., menu item interface 610). For example, the menu item interface can include menu item interface 610A. Menu item interface 610 can include a plurality of suggested menu items for a user. The menu items provided for display can be determined as top menu items based on a merchant selection model and/or merchant ranking model. The interface can include any means of organizing suggested menu items. For example, the organization can include at least one of one or more categories, images associated with one or more menu items, price points, or a search feature. A user can provide input indicating interest in one or more particular menu items.

In response to the user input indicative of interest in a particular menu item, the system can provide for display a user interface comprising an item details interface (e.g., item details interface 615). By way of example, 615A depicts a sample user interface. The user interface can include data indicative of one or more available modifications for a menu item. The data can also include a description of the selected menu item. Modifications can include at least one of adding ingredients, removing ingredients, vegetarian option, meat selection, (or other option related to food allergies and/or food preferences), size selection, rating, and/or a means for a user to provide input indicative of a selection. A user input can comprise a selection of one or more menu items associated with a selected merchant. In some examples, user input can be provided directly into a service application. Additionally, or alternatively, user input can be provided via an application programing interface (API) and/or a third-party application. The system can obtain data indicative of a selection of one or more menu items of one or more selected merchants for an add-on order. The system can coordinate delivery of one or more items associated with the primary order request and the add-on order request to a drop-off location associated with the primary order request.

In response to obtaining data indicative of a user selection of one or more items, the system can generate for display data comprising menu items plus view cart interface (e.g., menu item+view cart interface 620). By way of example, 620A depicts a sample user interface. The user interface can include a user interface similar to that of 610A including menu items. In addition, the user interface can include a means for a user to provide input indicative of a selection to be taken to a user interface associated with a cart. The cart can include one or more items that the user has added to their cart.

For example, the system can provide for display a cart modal interface 625. By way of example, 625A depicts a sample user interface. The user interface can include data indicative of one or more items associated with the add-on order. In addition, or alternatively, the cart modal interface 625 can include at least one of a distance between the pick-up location of the add-on order and the drop-off location of the primary order and add-on order, an estimated preparation time, options for user input of requests for items including utensils, etc., various pricing items (e.g., taxes, service fee, delivery fee, tip), and a means for user input indicating intent to place the add-on order.

For example, the system can provide for display a processing order interface 630. By way of example, 630A depicts a sample user interface. The user interface can include data indicative of an order being placed and processed. This processing order interface can serve as an in between interface before an order confirmation and tracking screen is provided for display.

The system can determine that the order has been processed and provide for display an order received interface 635. By way of example, 635A depicts a sample user interface. The user interface can include data indicative of an order in progress. For example, the user interface can include a graphical indication of the progress of an order and/or an option to view details associated with a delivery order. The data indicative of an order in progress depicted by order received interface 635 can include data associated with a primary order and/or an add-on order(s). The order progress can be determined from status information and/or other data provided by respective merchants associated with the primary order and add-on order(s) and/or by status information, location information, and/or other data provided by one or more couriers matched to the orders.

The system can provide for display an add-on interface 640 associated with one or more add-on orders. The user interface can be similar to the primary order interfaces depicted in FIG. 6B. The add-on order interface can include details about the add-on order and/or offers for one or more additional add-on orders to be placed.

The system can provide for display a your orders interface 645. By way of example, 645A depicts a sample user interface. For example, the user interface can include a primary order and one or more add-on orders. The user interface can include a means for a user to input an intent to track. In some embodiments, the user interface can include one or more additional add-on order merchants and/or menu items.

The system can determine a current status of the user device relative to the service application. For example, the current status can include an opened status, a locked screen status, and/or any other status. The system can provide for display one or more notifications at various points during a delivery service. The addition of an add-on order can result in an increase in the number of notifications to a user during the delivery service. In some instances, in response to determining the user has placed an add-on order, the system can dynamically suppress certain notifications. The suppression of these notifications can improve user experience by decreasing the disruption that notifications have. In addition, or alternatively, decreasing the number of notifications surfaced on a user device can provide for a decrease in processing power (from both surfacing the notification and receiving input in response to the notification) which can help free up memory and processing for other functions of the device. Decreasing the number of notifications surfaced on a user device can also increase the use time between charges for a user.

Figure 7:
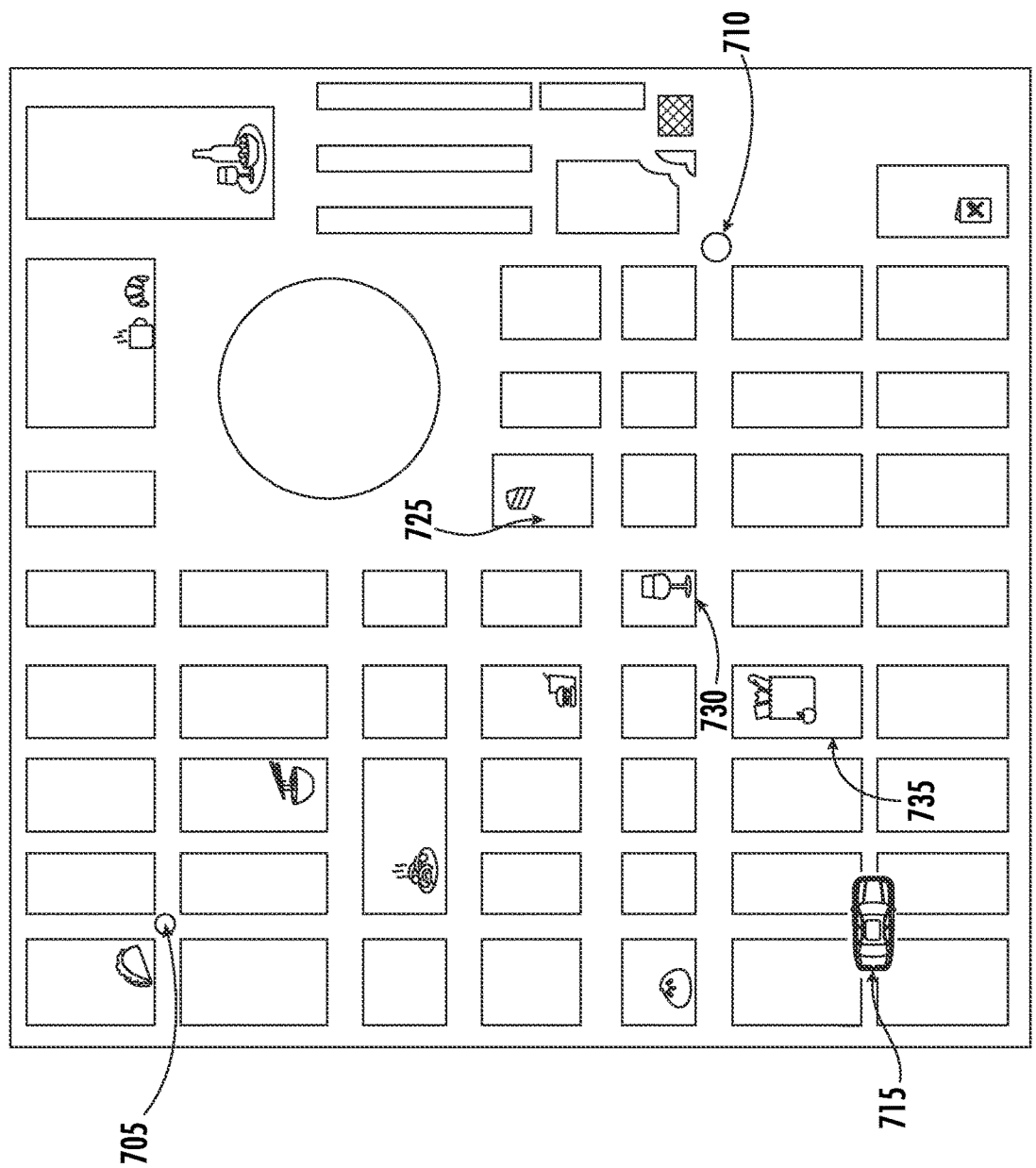
FIGS. 7-8 depict example geographic areas containing candidate merchants according to example embodiments of the present disclosure.

FIG. 7 depicts an example geographic area associated with a pick-up location, courier location, and drop-off location. The example geographic area 700 includes a plurality of candidate merchants associated with the geographic area 700. The geographic area 700 can include a pick-up location 705 associated with a primary order and a drop-off location 710 associated with a primary order. The geographic area 700 can include a courier location 715. For example, the primary order can be associated with merchant 720. The primary order can comprise one or more menu items. The computing system can determine the eligibility of a primary order associated with merchant 720 for an add-on order.

For example, the computing system can determine that an order is eligible for an add-on order based in part on the type of order (e.g., a standard order, non-priority order) and/or the eligibility of a primary merchant (e.g., merchant 720). For example, the eligibility of the primary merchant can be based in part on the drop-off location for the primary order being within a predefined radius of an eligible add-on merchant and the incremental courier distance being less than a predefined value (e.g., a market specific value). For example, an acceptable incremental distance in a rural and/or suburban area can be on the order of multiple miles whereas an acceptable incremental distance in an urban area can be on the order of less than a mile. The acceptable incremental distance can be a predetermined number, can be dynamically calculated based on factors identified herein, can be a proportion of the preparation time and/or expected route distance, and/or can be calculated or determined in any other reasonable manner.

In some implementations, the eligibility of a primary merchant can be based in part on the preparation time of one or more menu items associated with the primary merchant (e.g., merchant 720). For example, if the preparation time is above a threshold preparation time, the primary merchant can be labeled as ineligible for an add-on order. For example, the threshold preparation time can be predetermined and/or a set time (e.g., 5 minutes, 10 minutes). In addition, or alternatively, the threshold preparation time can be dynamic and based on a number of factors. For example, the factors can include the potential preparation time for one or more items associated with one or more candidate add-on merchants, the route between the courier's current location and the primary order pick-up location, the route between the pick-up location and the drop-off location, if an add-on merchant is located on a route of an alternative service the courier is performing for a user not associated with the primary order and/or the potential add-on order, or any other reasonable factors to consider.

In response to determining the primary order is eligible for an add-on order, the system can select one or more merchants and/or menu items for display for an add-on order. For example, these one or more selected merchants can be associated with the highest likelihood of conversion (e.g., a user is most likely to complete an add-on order with the one or more selected merchants compared to other available merchants). By way of example, merchant 720 can be a merchant associated with a primary order request. The system can determine that a user who has placed an order at merchant 720 is likely to place an add-on order for a beverage and/or dessert. Merchant 725 can be identified as a merchant associated with desserts. Merchants 730 and 735 can be identified as associated with beverages. The system can select one or more merchants to display as options for an add-on order. For example, the system can select merchants 725, 730, and 735 as selected merchants. The system can rank the merchants using the merchant ranking model. In response to determining a ranking of the selected merchants, the system can provide the selected merchants for display on a graphical user interface of a user device. The graphical user interface can also include data indicative of one or more available menu items associated with the selected merchants.

Figure 8:
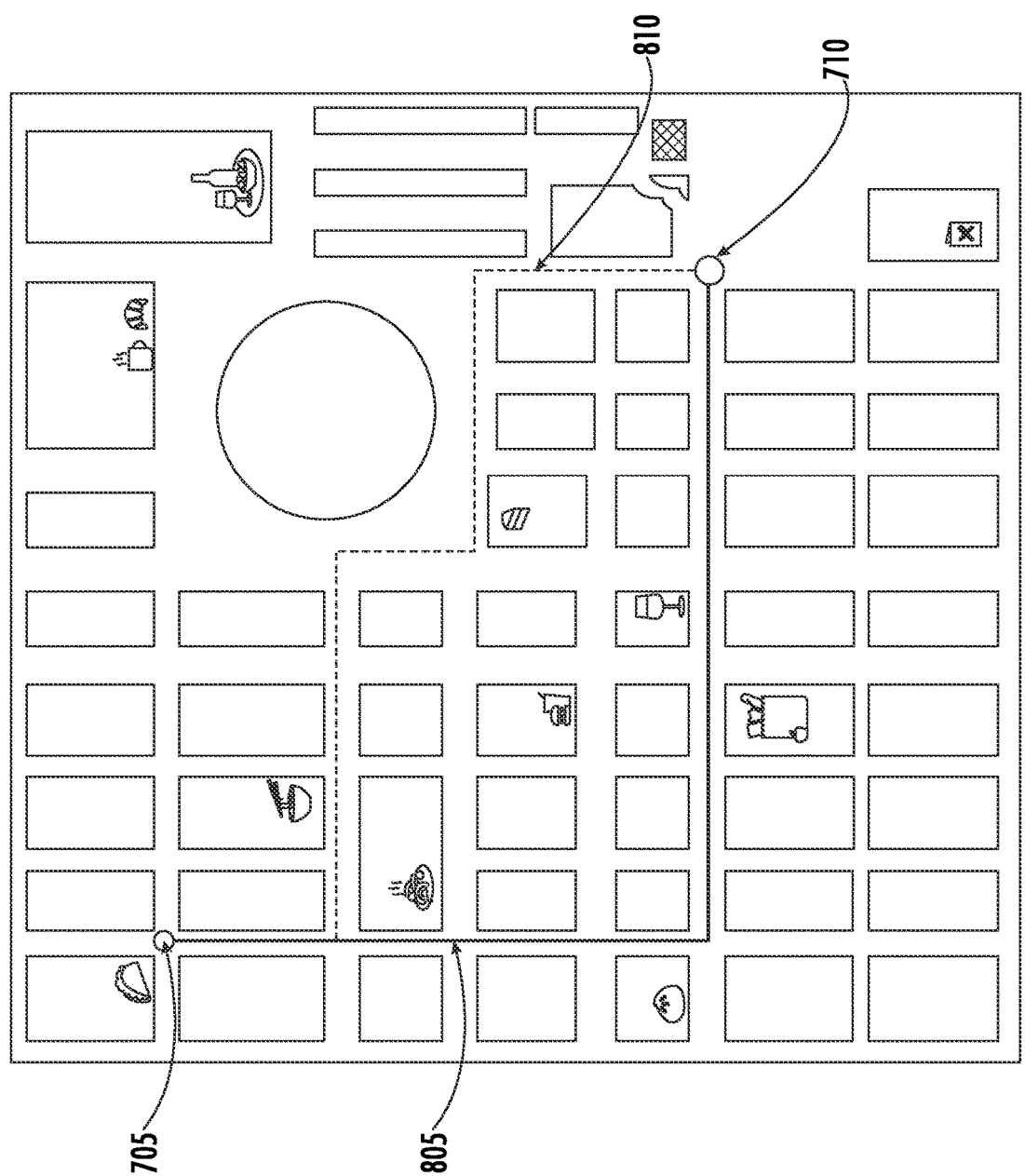

FIG. 8 depicts geographic area 700 and potential routes for a courier to travel between a pick-up location 705 and a drop-off location 710 associated with a primary order. The system can determine selection and ranking of the one or more candidate merchants based at least in part on features associated with pairing of the primary order and one or more candidate add-on orders. The features can include category, incremental travel distance, preparation time, etc. For example, incremental travel distance associated with merchant 730 can be greater than the incremental travel distance associated with merchant 735. The incremental travel distance associated with a merchant can be one of many factors used to determine the selection and/or ranking of merchants.

Additionally, or alternatively, the time to place an add-on order can be dynamically determined. For example, the time to place an add-on order can be based on an order preparation time of the primary order. Additionally, or alternatively, the time to place an add-on order can be a pre-specified time (e.g., 5, 10, 20, etc. minutes from placing the primary order). In some instances, the preparation time for the add-on order can be used in part to determine the selection and/or ranking of an add-on order.

For example, if a courier has picked up the primary order menu item and is following Route A 805 to the drop-off location, the system can surface an add-on order for a drink add-on order. For example, the drink add-on order can be associated with merchant 730 and/or merchant 735. As an example, a notification can comprise a message indicative of the courier's ability to add a stop on the way to the drop-off location (e.g., "your courier has left restaurant A with your food, would you like them to stop by and grab some drinks on the way to you?"). The system can obtain data indicative of a user accepting the offer for an add-on order. In response to the data indicative of the user accepting the offer for an add-on order, the system can surface a notification and/or request to a courier device indicative of an instruction to complete the add-on order. For example, the add-on order can be for an alcoholic beverage. In response to determining the add-on order is for an alcoholic beverage, the system can initiate an age and/or identification verification process.

In some implementations, the system can select and/or rank one or more candidate merchants based at least in part on the location of the add-on merchant, preparation time of the add-on item, food wait time (e.g., cold time, melt time), courier availability, courier accepting add-on order fulfillment request, management of ordering, and/or expected route between pick-up and drop-off location. Additionally, or alternatively, add-on order candidates can be chosen for display based on user data. User data can include profile information and/or historical user data. Historical user data can include data indicative of prior orders (e.g., if the user normally orders a drink with a particular primary order, user data associated with integrated applications, user data associated with third party applications). Historical user data can include aggregated user data indicative of historical orders of a plurality of users that have accounts associated with the food delivery service provider.

FIG. 9 depicts a flowchart diagram of an example method for selecting, ranking, and displaying menu items for add-on orders associated with a primary order according to example embodiments of the present disclosure. One or more portion(s) of the method 900 can be implemented by one or more computing devices such as, for example, the computing devices/systems described in FIGS. 1, 5, 10, and/or 11. Moreover, one or more portion(s) of the method 900 can be implemented as an algorithm on the hardware components of the device(s) described herein (e.g., as in FIGS. 1, 5, 10, and 11). For example, a computing system can include one or more processors and one or more non-transitory, computer-readable media storing instructions that are executable by the one or more processors to cause the computing system to perform operations, the operations including one or more of the operations/portions of method 900. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (905), the method 900 can include obtaining user data provided by a user through a graphical user interface associated with a delivery service application indicative of a primary order request. For instance, a computing system (e.g., an operations computing system associated with a service entity) can obtain user data provided by a user through a graphical user interface associated with a delivery service application, the user data being indicative of a primary order request. As described herein, the user data indicative of the primary order request can include data indicative of (i) a pick-up location, (ii) a merchant associated with the primary order request, (iii) one or more items for transport, and (iv) a drop-off location.

At (910), the method 900 can include determining, in response to obtaining the user data, that the primary order request is eligible for an add-on order. For instance, a computing system (e.g., an operations computing system associated with a service entity) can determine, in response to obtaining the user data, that the primary order request is eligible for an add-on order.

At (915), the method 900 can include determining, in response to the primary order request being eligible for the add-on order, one or more selected merchants for the add-on order, wherein the one or more selected merchants are determined from a plurality of candidate merchants based at least in part on analysis of merchant-specific data relative to the user data indicative of the primary order request. For instance, a computing system (e.g., an operations computing system associated with a service entity) can determine, in response to the primary order request being eligible for the add-on order, one or more selected merchants for the add-on order. As described herein, the one or more selected merchants are determined from a plurality of candidate merchants based at least in part on analysis of merchant-specific data relative to the user data indicative of the primary order request.

By way of example, merchant-specific data can include at least one of (i) one or more category labels, (ii) an incremental distance, (iii) a merchant status, (iv) a food preparation time, (v) one or more ratings, or (vi) delivery-related features. The one or more category labels can include a machine-learning based prediction of one or more cuisine types of a respective merchant of the one or more candidate merchants. The incremental distance can include at least one of an incremental haversine distance or an incremental estimated time of arrival. The merchant status can include at least one of a first status indicative of a respective merchant accepting orders or a second status indicative of a respective merchant not accepting orders.

As described herein, the computing system can determine, in response to the primary order request being eligible for the add-on order, one or more selected items for the add-on order. The one or more selected items can be determined from a plurality of candidate items associated with one or more candidate merchants based at least in part on analysis of at least one of (i) item data or (ii) merchant-specific data relative to the user data indicative of the primary order request. By way of example, the one or more selected items can include comestible (e.g., edible items) and/or non-comestible (e.g., inedible items). Determining the one or more selected merchants for the add-on order can be performed using a machine-learned merchant selection model. In some instances, the machine-learned merchant selection model is trained using data gathered by the computing system.

At (920), the method 900 can include updating the graphical user interface to display data associated with the one or more selected merchants and/or items available from the selected merchants for the add-on order. For instance, a computing system (e.g., an operations computing system associated with a service entity) can update the graphical user interface to display data associated with the one or more selected merchants for the add-on order. As described herein, the computing system can provide for display, via a user interface, data associated with the one or more selected items for the add-on order.

At (925), the method 900 can include ranking the one or more selected merchants (and/or items available from the selected merchants) based on data associated with the one or more selected merchants for the add-on order. For instance, a computing system (e.g., an operations computing system associated with a service entity) can rank the one or more selected merchants based on data associated with the one or more selected merchants for the add-on order.

As described herein, the ranking can be performed using a machine-learned ranking model that is trained using data gathered by the computing system. By way of example, the ranking can include providing for input into the machine-learned ranking model, data indicative of at least one of (i) a likelihood of conversion, (ii) a cost of fulfilling the add-on order, (iii) one or more waypoints associated with the primary order request, and/or (iv) one or more available transportation modes. In some embodiments the likelihood of conversion can be a probability of fulfilling an add-on order associated with a selected merchant. The method can include obtaining an output from the machine-learned ranking model indicative of a probability that the user will complete an add-on order purchase and an expected cost of fulfilling the add-on order purchase. The cost of fulfilling the add-on order can be determined based at least in part on at least one of (i) a user experience measure, (ii) a food freshness measure, (iii) an added travel time, (iv) an increased estimated time of arrival, or (v) an ability to match a primary order courier with the add-on order.

Additionally, or alternatively, the ranking can be performed using a rules-based ranking model.

At (930), the method 900 can include determining a top number of the one or more selected merchants. In addition, or alternatively, the method can include determining a top number of one or more menu items associated with one or more selected merchants. For instance, a computing system (e.g., an operations computing system associated with a service entity) can determine a top number of the one or more selected merchants. As described herein, determining the one or more selected merchants for the add-on order can include determining a probability that the user will complete an add-on order purchase and an expected cost of fulfilling the add-on order purchase.

At (935), the method 900 can include updating the graphical user interface to display data associated with the top number of the one or more selected merchants. In addition, or alternatively the method can include updating the graphical user interface to display data associated with a top number of one or more menu items associated with one or more selected merchants. For instance, a computing system (e.g., an operations computing system associated with a service entity) can update the graphical user interface to display data associated with the top number of the one or more selected merchants for display. In some instances, the method can include determining an offer window (e.g., a time within which a user is eligible to place an add-on order). Additionally, or alternatively, the method can include updating the graphical user interface to display the offer window.

At (940), the method 900 can include receiving user input provided through the graphical user interface indicative of a selection of one or more menu items associated with the one or more selected merchants for the add-on order. For instance, a computing system (e.g., an operations computing system associated with a service entity) can receive user input provided through the graphical user interface indicative of a selection of one or more menu items associated with the one or more selected merchants for the add-on order. As described herein, the computing system can obtain data indicative of a selection of one or more meu items of the one or more selected merchants for an add-on order.

At (945), the method 900 can include coordinating delivery of the primary order and the add-on order. For instance, a computing system (e.g., an operations computing system associated with a service entity) can coordinate delivery of the primary order and the add-on order. By way of example, to coordinate the delivery of the primary order and the add-on order, the computing system can send data indicative of a request to complete the add-on order to a user device associated with a courier that is completing the primary order request. The computing system can coordinate delivery of one or more items associated with the primary order request and the add-on order to a drop-off location associated with the primary order request. The computing system can obtain data indicative of an acceptance of the request to complete the add-on order by the courier. The computing system can send data indicative of a pick-up location associated with the add-on order to the courier. The computing system can obtain real-time data indicative of at least one of (i) a courier's location or (ii) a preparation status of the add-on order.

By way of example, coordinating the delivery of the primary order and the add-on order can further include the computing system generating, in response to obtaining the real-time data indicative of at least one of (i) the courier's location or (ii) the preparation status of the add-on order, data indicative of an order update. The computing system can update the graphical user interface to display the data indicative of the order update.

Figure 10:
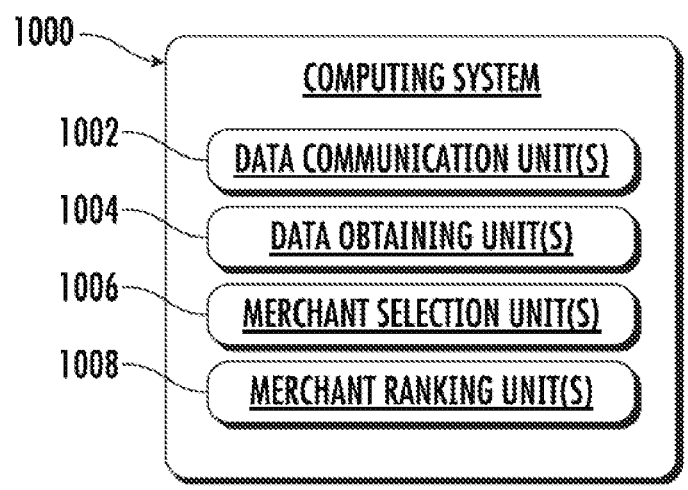
FIGS. 10 and 11 depict block diagrams of example systems according to example embodiments of the present disclosure.

Various means can be configured to perform the methods and processes described herein. For example, FIG. 10 depicts an example system 1000 that includes various means according to example embodiments of the present disclosure. The computing system 1000 can be and/or otherwise include, for example, an operations computing system, etc. The computing system 1000 can include data communication unit(s) 1002, data obtaining unit(s) 1004, merchant selection unit(s) 1006, merchant ranking unit(s) 1008, and/or other means for performing the operations and functions described herein. In some implementations, one or more of the units can be implemented separately. In some implementations, one or more units can be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data communication unit(s) 1002) can be configured to communicate data indicative of a request for a courier to perform a delivery service associated with a delivery service request (e.g., a primary and/or add-on order request).

In addition, the means (e.g., data obtaining unit(s) 1004) can be configured to obtain data associated with a delivery service request. For example, delivery service request can be indicative of a pick-up location, merchant, item, and/or drop-off location associated with a delivery service request. In addition, in some implementations, the means (e.g., the data obtaining unit(s) 1004) can obtain data associated with one or more couriers, one or more merchants, and/or map data indicative of one or more geographic areas.

In addition, the means (e.g., merchant selection unit(s) 1006) can be configured to determine one or more selected merchants from a plurality of candidate merchants for an add-on order. For example, the plurality of candidate merchants can be available for an add-on order associated with the primary order request. By way of example, the plurality of candidate merchants can include merchants of various categories, locations, preparation times, etc.

In addition, the means (e.g., merchant ranking unit(s) 1008) can be configured to determine a ranking of selected merchants for display on a user device as add-on order. In addition, or alternatively, the selected merchants for display can be determined ranked based on contextual data and/or user data.

These described functions of the means are provided as examples and are not meant to be limiting. The means can be configured for performing any of the operations and functions described herein.

Figure 11:
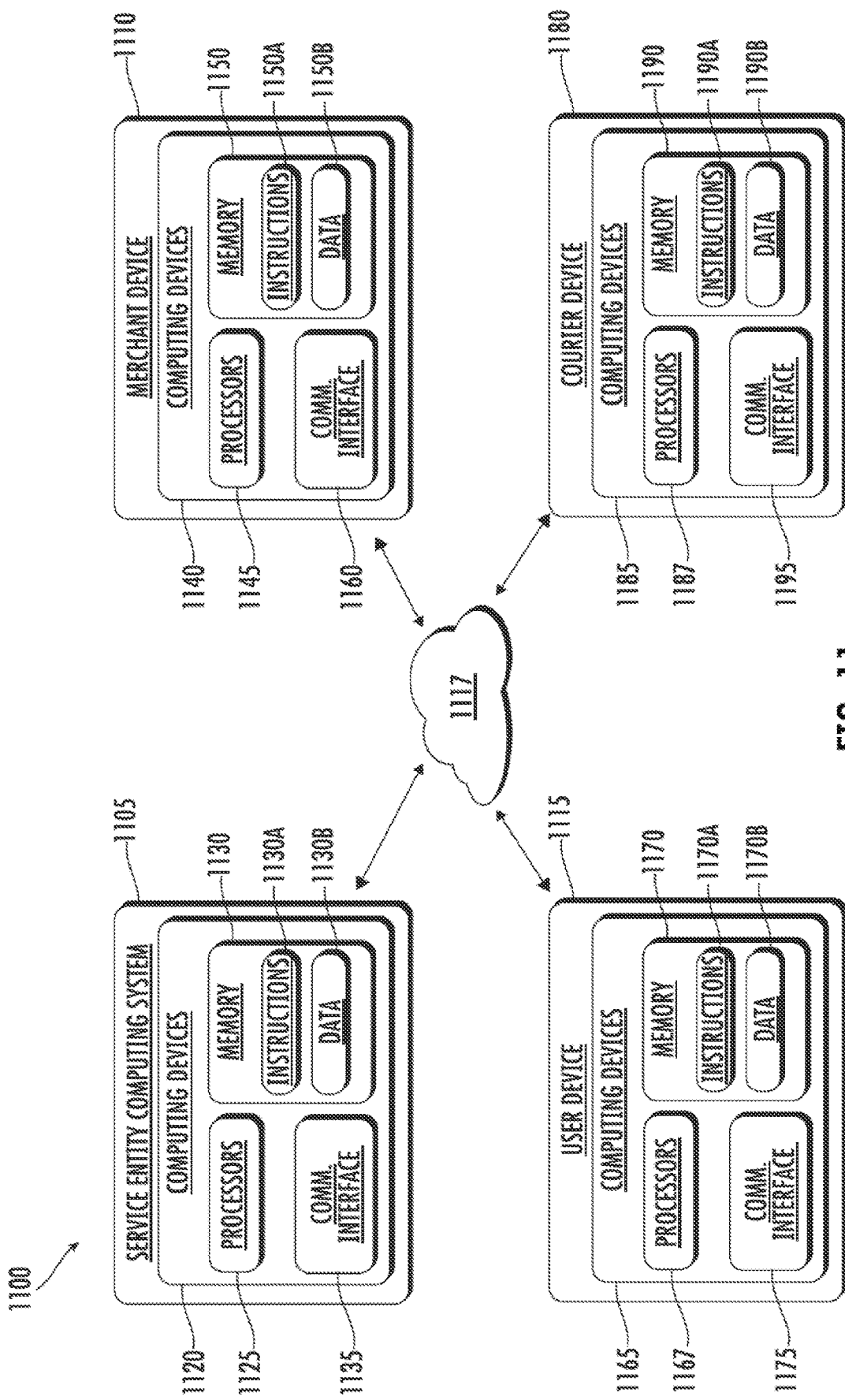

FIG. 11 depicts a block diagram of an example system 1100 for implementing systems and methods according to example embodiments of the present disclosure. The example system 1100 illustrated in FIG. 11 is provided as an example only. The components, systems, connections, and/or other aspects illustrated in FIG. 11 are optional and are provided as examples of what is possible, but not required, to implement the present disclosure. The example system 1100 can include a service entity computing system 1105 (e.g., that is associated with a delivery service entity). The example system 1100 can include one or more merchant devices 1110 (e.g., that is associated with a merchant). The example system 1100 can include one or more user devices 1115 (e.g., user device of the user, user device of the operator, user device of the vehicle). The example system 1100 can include one or more courier devices (e.g., a display device positioned on the exterior of a vehicle). One or more of the service entity computing system 1105, the merchant device 1110, the user device 1115, or the courier device can be communicatively coupled to one another over one or more communication network(s) 1117. The networks 1117 can correspond to any of the networks described herein.

The computing device(s) 1120 of the service entity computing system 1105 can include processor(s) 1125 and a memory 1130. The one or more processors 1125 can be any suitable processing device (e.g., a processor core, a microprocessor, an ASIC, a FPGA, a controller, a microcontroller) and can be one processor or a plurality of processors that are operatively connected. The memory 1130 can include one or more non-transitory computer-readable storage media, such as RAM, ROM, EEPROM, EPROM, one or more memory devices, flash memory devices, data registrar, etc., and combinations thereof.

The memory 1130 can store information that can be accessed by the one or more processors 1125. For example, the memory 1130 (e.g., one or more non-transitory computer-readable storage mediums, memory devices) can include computer-readable instructions 1130A that can be executed by the one or more processors 1125. The instructions 1130A can be software written in any suitable programming language or can be implemented in hardware.

Additionally, or alternatively, the instructions 1130A can be executed in logically and/or virtually separate threads on processor(s) 1125.

For example, the memory 1130 can store instructions 1130A that when executed by the one or more processors 1125 cause the one or more processors 1125 (the service entity computing system 1105) to perform operations such as any of the operations and functions of the computing system(s) (e.g., operations computing system) described herein (or for which the system(s) are configured), one or more of the operations and functions for communicating between the computing systems, one or more portions/operations of method 900, and/or one or more of the other operations and functions of the computing systems described herein.

The memory 1130 can store data 1130B that can be obtained (e.g., acquired, received, retrieved, accessed, created, stored). The data 1130B can include, for example, any of the data/information described herein. In some implementations, the computing device(s) 1320 can obtain data from one or more memories that are remote from the service entity computing system 1305.

The computing device(s) 1120 can also include a communication interface 1135 used to communicate with one or more other system(s) remote from the service entity computing system 1105, such as merchant device 1110, user device 1115, and/or courier device 1180. The communication interface 1135 can include any circuits, components, software, etc. for communicating via one or more networks (e.g., network(s) 1117). The communication interface 1135 can include, for example, one or more of a communications controller, receiver, transceiver, transmitter, port, conductors, software and/or hardware for communicating data.

The merchant device 1110 can include one or more computing device(s) 1140 that are remote from the service entity computing system 1105, the user device 1115, and the courier device 1180. The computing device(s) 1140 can include one or more processors 1145 and a memory 1150. The one or more processors 1145 can be any suitable processing device (e.g., a processor core, a microprocessor, an ASIC, a FPGA, a controller, a microcontroller) and can be one processor or a plurality of processors that are operatively connected. The memory 1150 can include one or more tangible, non-transitory computer-readable storage media, such as RAM, ROM, EEPROM, EPROM, one or more memory devices, flash memory devices, data registrar, etc., and combinations thereof.

The memory 1150 can store information that can be accessed by the one or more processors 1145. For example, the memory 1150 (e.g., one or more tangible, non-transitory computer-readable storage media, one or more memory devices) can include computer-readable instructions 1150A that can be executed by the one or more processors 1145. The instructions 1150A can be software written in any suitable programming language or can be implemented in hardware. Additionally, or alternatively, the instructions 1150A can be executed in logically and/or virtually separate threads on processor(s) 1145.

For example, the memory 1150 can store instructions 1150A that when executed by the one or more processors 1145 cause the one or more processors 1145 to perform operations such as any of the operations and functions of the computing system(s) (e.g., merchant server) described herein (or for which the system(s) are configured), one or more of the operations and functions for communicating between computing systems, one or more portions/operations of method 900, and/or one or more of the other operations and functions of the computing systems described herein. The memory 1150 can store data 1150B that can be obtained. The data 1150B can include, for example, any of the data/information described herein.

The computing device(s) 1140 can also include a communication interface 1160 used to communicate with one or more system(s) that are remote from the merchant device 1110. The communication interface 1160 can include any circuits, components, software, etc. for communicating via one or more networks (e.g., network(s) 1117). The communication interface 1160 can include, for example, one or more of a communications controller, receiver, transceiver, transmitter, port, conductors, software and/or hardware for communicating data.

The user device 1115 can include one or more computing device(s) 1165 that are remote from the service entity computing system 1105, the merchant device 1110, and the courier device 1180. The computing device(s) 1165 can include one or more processors 1167 and a memory 1170. The one or more processors 1167 can be any suitable processing device (e.g., a processor core, a microprocessor, an ASIC, a FPGA, a controller, a microcontroller) and can be one processor or a plurality of processors that are operatively connected. The memory 1170 can include one or more tangible, non-transitory computer-readable storage media, such as RAM, ROM, EEPROM, EPROM, one or more memory devices, flash memory devices, data registrar, etc., and combinations thereof.

The memory 1170 can store information that can be accessed by the one or more processors 1167. For example, the memory 1170 (e.g., one or more tangible, non-transitory computer-readable storage media, one or more memory devices) can include computer-readable instructions 1170A that can be executed by the one or more processors 1167. The instructions 1170A can be software written in any suitable programming language or can be implemented in hardware. Additionally, or alternatively, the instructions 1170A can be executed in logically and/or virtually separate threads on processor(s) 1167.

For example, the memory 1170 can store instructions 1170A that when executed by the one or more processors 1167 cause the one or more processors 1167 to perform operations such as any of the operations and functions of the computing system(s) (e.g., user devices) described herein (or for which the user device(s) are configured), one or more of the operations and functions for communicating between systems, one or more portions/operations of method 900, and/or one or more of the other operations and functions of the computing systems described herein. The memory 1170 can store data 1170B that can be obtained. The data 1170B can include, for example, any of the data/information described herein.

The computing device(s) 1165 can also include a communication interface 1175 used to communicate computing device/system that is remote from the user device 1115, such as merchant device 1110, service entity computing system 1105, or courier device 1180. The communication interface 1175 can include any circuits, components, software, etc. for communicating via one or more networks (e.g., network(s) 1117). The communication interface 1175 can include, for example, one or more of a communications controller, receiver, transceiver, transmitter, port, conductors, software and/or hardware for communicating data.

The computing device(s) 1185 of the courier device 1180 can include processor(s) 1187 and a memory 1190. The one or more processors 1187 can be any suitable processing device (e.g., a processor core, a microprocessor, an ASIC, a FPGA, a controller, a microcontroller) and can be one processor or a plurality of processors that are operatively connected. The memory 1190 can include one or more non-transitory computer-readable storage media, such as RAM, ROM, EEPROM, EPROM, one or more memory devices, flash memory devices, data registrar, etc., and combinations thereof.

The memory 1190 can store information that can be accessed by the one or more processors 1187. For example, the memory 1190 (e.g., one or more non-transitory computer-readable storage mediums, memory devices) can include computer-readable instructions 1190A that can be executed by the one or more processors 1187. The instructions 1190A can be software written in any suitable programming language or can be implemented in hardware. Additionally, or alternatively, the instructions 1190A can be executed in logically and/or virtually separate threads on processor(s) 1187.

For example, the memory 1190 can store instructions 1190A that when executed by the one or more processors 1187 cause the one or more processors 1187 (the courier device 1180) to perform operations such as any of the operations and functions of the display device(s) described herein (or for which such devices are configured), one or more of the operations and functions for communicating between the computing systems/devices, one or more portions/operations of method 900, and/or one or more of the other operations and functions of the computing systems described herein.

The memory 1190 can store data 1190B that can be obtained (e.g., acquired, received, retrieved, accessed, created, stored). The data 1190B can include, for example, any of the data/information described herein. In some implementations, the computing device(s) 1185 can obtain data from one or more memories that are remote from the courier device 1180.

The computing device(s) 1185 can also include a communication interface 1195 used to communicate with one or more other system(s) remote from the courier device 1180, such as merchant device 1110, user device 1115, and/or service entity computing system 1105. The communication interface 1195 can include any circuits, components, software, etc. for communicating via one or more networks (e.g., network(s) 1117). The communication interface 1195 can include, for example, one or more of a communications controller, receiver, transceiver, transmitter, port, conductors, software and/or hardware for communicating data.

The network(s) 1117 can be any type of network or combination of networks that allows for communication between devices. In some implementations, the network(s) 1117 can include one or more of a local area network, wide area network, the Internet, secure network, cellular network, mesh network, peer-to-peer communication link and/or some combination thereof and can include any number of wired or wireless links. Communication over the network(s) 1117 can be accomplished, for example, via a communication interface using any type of protocol, protection scheme, encoding, format, packaging, etc.

Computing tasks discussed herein as being performed at certain computing device(s)/systems can instead be performed at another computing device/system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some implementations are described with a reference numeral for example illustrated purposes and is not meant to be limiting.

What is claimed is:

1. A computing system comprising:
   one or more processors; and
   one or more non-transitory, computer-readable media storing instructions that are executable by the one or more processors to cause the computing system to perform operations, the operations comprising:
   accessing user data provided by a user through a user interface associated with a delivery service application, the user data being indicative of a primary order request;
   determining, in response to accessing the user data, that the primary order request is eligible for an add-on order;
   determining, utilizing a machine-learned model trained on user data, in response to the primary order request being eligible for the add-on order, one or more selected merchants for the add-on order from a plurality of candidate merchants by:
     accessing, by the machine-learned model, input data comprising: (i) merchant-specific data and (ii) user data indicative of the primary order request; and
     processing, by the machine-learned model, the input data comprising the (i) merchant-specific data and (ii) user data indicative of the primary order request to generate output comprising a probability that the user completes an add on order associated with at least one merchant of the plurality of candidate merchants; and
   modifying the user interface to display data associated with the one or more selected merchants for the add-on order.

2. The computing system of claim 1, the operations further comprising:
   ranking the one or more selected merchants based on data associated with the one or more selected merchants for the add-on order;
   determining a top number of the one or more selected merchants; and
   updating the user interface to display data associated with the top number of the one or more selected merchants for display.

3. The computing system of claim 2, wherein the ranking is performed using a machine-learned ranking model that is trained using data gathered by the computing system.

4. The computing system of claim 3, wherein the ranking further comprises:
   providing for input into the machine-learned ranking model, data indicative of at least one of:
   (i) A likelihood of conversion for the add-on order,
   (ii) a cost of fulfilling the add-on order,
   (iii) one or more waypoints associated with the primary order request, or
   (iv) one or more available transportation modes; and
   obtaining an output from the machine-learned ranking model indicative of a probability that the user will complete an add-on order purchase and an expected cost of fulfilling the add-on order purchase.

5. The computing system of claim 4, wherein the cost of fulfilling the add-on order is determined based at least in part on at least one of:
   a user experience measure,
   (ii) a food freshness measure,
   (iii) an added travel time,
   (iv) an increased estimated time of arrival, or
   (v) an ability to match a primary order courier with the add-on order.

6. The computing system of claim 2, wherein the ranking is performed using a rules-based ranking model.

7. The computing system of claim 1, the operations further comprising:
   obtaining data indicative of a selection of one or more menu items of the one or more selected merchants for an add-on order; and
   coordinating delivery of one or more items associated with the primary order request and the add-on order to a drop-off location associated with the primary order request.

8. The computing system of claim 1, the operations further comprising:
   determining an offer window for the add-on order; and
   updating the user interface to display the offer window.

9. The computing system of claim 1, wherein the merchant-specific data comprises at least one of:
   (i) one or more category labels,
   (ii) an incremental distance,
   (iii) a merchant status,
   (iv) a food preparation time,
   (v) one or more ratings, or
   (vi) delivery-related features.

10. The computing system of claim 9, wherein the one or more category labels comprise a machine-learning based prediction of one or more cuisine types of a respective merchant of the plurality of candidate merchants.

11. The computing system of claim 9, wherein the incremental distance comprises at least one of an incremental haversine distance or an incremental estimated time of arrival.

12. The computing system of claim 9, wherein the merchant status comprises at least one of a first status indicative of a respective merchant accepting orders or a second status indicative of a respective merchant not accepting orders.

13. The computing system of claim 1, wherein determining the one or more selected merchants for the add-on order is performed using a machine-learned merchant selection model that is trained using data gathered by the computing system.

14. A method comprising:
   accessing user data provided by a user through a user interface associated with a delivery service application, the user data being indicative of a primary order request;
   determining, in response to accessing the user data, that the primary order request is eligible for an add-on order;
   determining, utilizing a machine-learned model trained on user data, in response to the primary order request being eligible for the add-on order, one or more selected merchants for the add-on order from a plurality of candidate merchants by:
      accessing, by the machine-learned model, input data comprising: (i) merchant-specific data and (ii) user data indicative of the primary order request; and
      processing, by the machine-learned model, the input data comprising the (i) merchant-specific data and (ii) user data indicative of the primary order request to generate output comprising a probability that the user completes an add on order associated with at least one merchant of the plurality of candidate merchants;
   modifying the user interface to display data associated with the one or more selected merchants for the add-on order;
   receiving user input provided through the user interface indicative of a selection of one or more menu items associated with the one or more selected merchants for the add-on order; and
   coordinating delivery of the primary order and the add-on order.

15. The method of claim 14, wherein coordinating the delivery of the primary order and the add-on order comprises:
   sending data indicative of a request to complete the add-on order to a user device associated with a courier that is completing the primary order request;
   obtaining data indicative of an acceptance of the request to complete the add-on order by the courier;
   sending data indicative of a pick-up location associated with the add-on order to the courier; and
   obtaining real-time data indicative of at least one of (i) a courier's location or (ii) a preparation status of the add-on order.

16. The method of claim 15, wherein coordinating the delivery of the primary order and the add-on order further comprises:
   generating, in response to obtaining the real-time data indicative of at least one of (i) the courier's location or (ii) the preparation status of the add-on order, data indicative of an order update; and
   updating the user interface to display the data indicative of the order update.

17. The method of claim 14, further comprising:
   ranking the one or more selected merchants based on data associated with the one or more selected merchants for the add-on order, wherein the ranking is performed using a machine-learned ranking model;

determining a top number of one or more menu items associated with one or more selected merchants; and updating the user interface to display data associated with the top number of the one or more menu items for display.

18. The method of claim 14, wherein determining the one or more selected merchants for the add-on order comprises determining a probability that the user will complete an add-on order purchase and an expected cost of fulfilling the add-on order purchase.

19. One or more non-transitory computer readable media storing instructions that are executable by one or more processors to perform operations comprising:

accessing user data provided by a user through a user interface associated with a delivery service application, the user data being indicative of a primary order request;

determining, in response to accessing the user data, that the primary order request is eligible for an add-on order, determining, utilizing a machine-learned model trained on user data, in response to the primary order request being eligible for the add-on order, one or more selected items for the add-on order from a plurality of candidate items associated with one or more candidate merchants (ii)

by:

accessing, by the machine-learned model, input data comprising: (i) merchant-specific data and (ii) user data indicative of the primary order request; and processing, by the machine-learned model, the input data comprising the (i) merchant-specific data and (ii) user data indicative of the primary order request to generate output comprising a probability that the user completes an add on order associated with at least one merchant of the one or more candidate merchants; and modifying the user interface to provide for display data associated with the one or more selected items for the add-on order.

20. The computer readable media of claim 19, wherein the one or more items comprise at least one of a comestible item or a non-comestible item.

* * * * *